US008705657B2

(12) United States Patent
Lai et al.

(10) Patent No.: US 8,705,657 B2
(45) Date of Patent: Apr. 22, 2014

(54) DIGITAL SIGNAL PROCESSING CIRCUIT FOR GENERATING OUTPUT SIGNAL ACCORDING TO NON-OVERLAPPING CLOCK SIGNALS AND INPUT BIT STREAMS AND RELATED WIRELESS COMMUNICATION TRANSMITTERS

(75) Inventors: Jie-Wei Lai, Taipei (TW); Yang-Chuan Chen, Chiayi County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 118 days.

(21) Appl. No.: 13/159,385

(22) Filed: Jun. 13, 2011

(65) Prior Publication Data
US 2012/0128092 A1    May 24, 2012

Related U.S. Application Data

(60) Provisional application No. 61/416,198, filed on Nov. 22, 2010.

(51) Int. Cl.
*H03C 3/00* (2006.01)

(52) U.S. Cl.
USPC ........... 375/302; 375/297; 375/295; 375/350; 455/285; 455/302

(58) Field of Classification Search
USPC .......................... 375/295, 297, 135, 261, 350
See application file for complete search history.

(56) References Cited

U.S. PATENT DOCUMENTS

| | | | | |
|---|---|---|---|---|
| 6,359,523 B1 * | 3/2002 | Kuwano | | 332/103 |
| 6,411,646 B1 * | 6/2002 | Walley et al. | | 375/146 |
| 7,519,348 B2 * | 4/2009 | Shah | | 455/285 |
| 2001/0010474 A1 * | 8/2001 | Alexander | | 327/202 |
| 2006/0029171 A1 * | 2/2006 | Jensen | | 375/350 |
| 2006/0062324 A1 | 3/2006 | Naito | | |
| 2006/0088123 A1 * | 4/2006 | Jensen et al. | | 375/295 |
| 2007/0147541 A1 * | 6/2007 | Saito | | 375/297 |
| 2008/0043818 A1 * | 2/2008 | Tal et al. | | 375/135 |
| 2011/0103508 A1 * | 5/2011 | Mu et al. | | 375/295 |

OTHER PUBLICATIONS

Kousai, "An Octave-Range Watt-Level Fully Integrated CMOS Switching Power Mixer Array for Linearization and Back-Off Efficiency Improvement", pp. 376-377 and a page comprising Figure 22.2.7, ISSCC 2009/Session 22/PA and Antenna Interface/22.2, Feb. 11, 2009.

Nzeza, "Reconfigurable Complex Digital Delta-Sigma Modulator Synthesis for Digital Wireless Transmitters", pp. 320-325, 2008 IEEE.

(Continued)

*Primary Examiner* — Eva Puente
(74) *Attorney, Agent, or Firm* — Winston Hsu; Scott Margo

(57) ABSTRACT

A digital signal processing circuit includes a combining stage and an output stage. The combining stage is arranged to receive a plurality of non-overlapping clock signals having a same frequency but different phases, receive a plurality of first input bit streams, and generate a first output bit stream by combining the first input bit streams according to the non-overlapping clock signals. The output stage is arranged to generate an output according to the first output bit stream. A digital signal processing method includes: receiving a plurality of non-overlapping clock signals having a same frequency but different phases; receiving a plurality of first input bit streams; generating a first output bit stream by combining the first input bit streams according to the non-overlapping clock signals; and generating an output according to the first output bit stream.

20 Claims, 19 Drawing Sheets

(56) References Cited

OTHER PUBLICATIONS

Nzeza, "Reconfigurable Digital Delta-Sigma Modulator Synthesis for Digital Wireless Transmitters", pp. 480-483, 2007 IEEE.

Frappe, "All-digital RF signal generation for software defined radio transmitters", Circuits and Systems for Communications, 2008.

Eloranta, "A Multimode Transmitter in 0.13 um CMOS Using Direct-Digital RF Modulator", IEEE Journal of Solid-State Circuits, pp. 2774-2784, vol. 42, No. 12, Dec. 2007.

Jerng, "A Wideband Delta-Sigma Digital-RF Modulator for High Data Rate Transmitters", IEEE Journal of Solid-State Circuits, pp. 1710-1722, vol. 42, No. 8, Aug. 2007.

Staszewski, "All-Digital PLL and Transmitter for Mobile Phones", IEEE Journal of Solid-State Circuits, pp. 2469-2482, vol. 40, No. 12, Dec. 2005.

Mehta, "A 0.8mm2 All-Digital SAW-Less Polar Transmitter in 65nm EDGE SoC", pp. 58-59 and a page comprising Figure 3.2.7, ISSCC 2010/Session 3/Cellular Techniques/3.2, Feb. 8, 2010.

Pozsgay, "A Fully Digital 65nm CMOS Transmitter for the 2.4-to-2.7GHz WiFi/WiMAX Bands using 5.4GHz delta-sigma RF DACs", pp. 360-361 & 619, ISSCC 2008/Session 20/WLAN/WPAN/20.3, Feb. 5, 2008.

\* cited by examiner

DIGITAL SIGNAL PROCESSING CIRCUIT FOR GENERATING OUTPUT SIGNAL ACCORDING TO NON-OVERLAPPING CLOCK SIGNALS AND INPUT BIT STREAMS AND RELATED WIRELESS COMMUNICATION TRANSMITTERS

CROSS REFERENCE TO RELATED APPLICATIONS

This application claims the benefit of U.S. provisional application No. 61/416,198, filed on Nov. 22, 2010 and incorporated herein by reference.

BACKGROUND

The disclosed embodiments of the present invention relate to a digital signal processing circuit for generating an output signal according to non-overlapping clock signals and input bit streams and related wireless communication transmitters.

Use of digital power amplifiers (DPAs) is desirable in some transmitters within wireless communication systems to enhance power efficiency, reduce the hardware cost and reduce the chip size. The conventional topologies of the digital radio-frequency (RF) transmitter front-end may include a digital polar transmitter and an I/Q RF digital-to-analog converter (DAC). In a condition where the digital polar transmitter and the I/Q RF DAC are both implemented using the same silicon area, the power efficiency of the digital polar transmitter is higher than that of the I/Q RF DAC. Please refer to FIG. 1 and FIG. 2. FIG. 1 is a diagram illustrating a simplified digital polar transmitter 100 having power amplifiers implemented in silicon areas A+ and A−. FIG. 2 is a diagram illustrating a simplified I/Q RF DAC 200 having power amplifiers implemented in two smaller silicon areas ½·A+ and two silicon areas ½·A−. Each of the digital polar transmitter 100 and the I/Q RF DAC 200 generates a differential output including a positive RF signal RF+ and a negative RF signal RF−. Regarding the conventional digital polar transmitter 100, power amplifiers implemented in the silicon area A+ generate the positive RF signal RF+ according to a phase modulation signal AM and an amplitude modulation signal PM, and power amplifiers implemented in the other silicon area A− generate the negative RF signal RF− according to the phase modulation signal AM and the amplitude modulation signal PM. The upmixing power P1 of positive RF signal RF+/negative RF signal RF− generated from the digital polar transmitter 100 may be expressed as follows.

$$P1 = \alpha \cdot e^{j\phi(t)} \times \beta \cdot e^{j\omega_{LO} t} \quad (1)$$

$$= A(t) e^{j\phi(t)} \times \frac{4}{\pi} e^{j\omega_{LO} t}$$

$$\cong 1.27 A(t) e^{j[\omega_{LO} t + \phi(t)]}$$

In above equation (1), the parameter $\alpha$ depends on the silicon area in which the power amplifiers are disposed, and the parameter $\beta$ depends on the coefficient of a first-order harmonic term of a periodic square wave signal involved in up-conversion. In this example, $\alpha = A(t)$ and $$\beta = \frac{4}{\pi}.$$

Regarding the conventional I/Q RF DAC 200, power amplifiers implemented in two silicon areas ½·A+ generate the positive RF signal RF+ according to an in-phase input I, a quadrature input Q, a local oscillator (LO) input LO_I with a duty cycle of 50%, and an LO input LO_Q with a duty cycle of 50%; besides, power amplifiers implemented in the other two silicon areas ½·A− generate the negative RF signal RF− according to the in-phase input I, the quadrature input Q, the LO input LO_I with the duty cycle of 50%, and the LO input LO_Q with the duty cycle of 50%. As the conventional I/Q RF DAC 200 employs LO inputs each having a duty cycle of 50%, the LO inputs are not non-overlapping clock signals. Thus, at any moment, some power amplifiers of the in-phase channel and some power amplifiers of the quadrature channel should be active simultaneously. As a result, the up-conversion of the in-phase input I and the up-conversion of the quadrature input Q cannot share the same power amplifier, and therefore require respective dedicated power amplifiers. As to the I/Q RF DAC 200, the aforementioned mention parameter $\alpha$ would become $$\frac{1}{\sqrt{2}} \cdot A(t)$$

due to the smaller silicon area ½·A+/½·A−. Suppose that the LO input is implemented by the same periodic square wave signal having a first-order harmonic term with a coefficient of $$\frac{4}{\pi}.$$

Therefore, the upmixing power P2 of positive RF signal RF+/negative RF signal RF− generated from the conventional I/Q RF DAC 200 may be expressed as follows.

$$P2 = \frac{1}{\sqrt{2}} \cdot A(t) e^{j\phi(t)} \times \frac{4}{\pi} e^{j\omega_{LO} t} \cong 0.9 A(t) e^{j[\omega_{LO} t + \phi(t)]} \quad (2)$$

As can be seen from above equations (1) and (2), the power efficiency of the digital polar transmitter 100 is twice as large as that of the I/Q RF DAC 200 when respective consumed silicon areas are the same. Thus, the I/Q RF DAC 200 requires more than double silicon area to deliver the same amount of power as the digital polar transmitter 100 counting the power loss due to overlapped quadrature signals. However, the I/Q RF DAC topology has certain advantages/benefits over the digital polar transmitter topology. For example, compared to the digital polar transmitter topology, the I/Q RF DAC topology has better signal integrity and lower signal bandwidth requirement, and can avoid the use of a high clock rate CORDIC (Coordinate Rotation Digital Computer) which consumes large chip area and digital power. Thus, there is a need for an innovative IQ processing-based transmitter design with improved power efficiency.

SUMMARY

In accordance with exemplary embodiments of the present invention, a digital signal processing circuit for generating an output signal according to non-overlapping clock signals and input bit streams and related wireless communication transmitters are proposed to solve the above-mentioned problem.

According to a first aspect of the present invention, an exemplary digital signal processing circuit is disclosed. The exemplary digital signal processing circuit includes a combining stage and an output stage. The combining stage is arranged to receive a plurality of non-overlapping clock signals having a same frequency but different phases, receive a plurality of first input bit streams, and generate a first output bit stream by combining the first input bit streams according to the non-overlapping clock signals. The output stage is arranged to generate an output signal according to the first output bit stream.

According to a second aspect of the present invention, an exemplary digital signal processing method is disclosed. The exemplary digital signal processing method includes: receiving a plurality of non-overlapping clock signals having a same frequency but different phases; receiving a plurality of first input bit streams; generating a first output bit stream by combining the first input bit streams according to the non-overlapping clock signals; and generating an output signal according to the first output bit stream.

According to a third aspect of the present invention, an exemplary digital signal processing circuit is disclosed. The exemplary digital signal processing circuit includes a combining stage and an output stage. The combining stage is arranged to receive a plurality of non-overlapping clock signals having a same frequency but different phases, receive a plurality of input bit streams, and alternately output bits of the input bit streams under a timing control provided by the non-overlapping clock signals. The output stage is arranged to be shared by the input bit streams for processing the bits of the input bit streams.

According to a fourth aspect of the present invention, an exemplary digital signal processing method is disclosed. The exemplary digital signal processing method includes: receiving a plurality of non-overlapping clock signals having a same frequency but different phases; receiving a plurality of input bit streams; alternately output bits of the input bit streams under a timing control provided by the non-overlapping clock signals; and utilizing an output stage shared by the input bit streams for processing the bits of the input bit streams.

According to a fifth aspect of the present invention, an exemplary wireless communication transmitter is disclosed. The exemplary wireless communication transmitter includes a clock generator, a digital modulator, and a plurality of digital signal processing circuits. The clock generator is arranged to generate a plurality of non-overlapping clock signals having a same frequency but different phases. The digital modulator is arranged to generate a digital input which carries in-phase channel information and quadrature channel information in a Cartesian domain. Each of the digital signal processing circuits includes a combining stage and an output stage. The combining stage is arranged to receive the non-overlapping clock signals, receive a plurality of input bit streams derived from the digital input, and generate an output bit stream by combining the input bit streams according to the non-overlapping clock signals. The output stage is arranged to generate an output signal to an output port of the wireless communication transmitter according to the output bit stream.

According to a sixth aspect of the present invention, an exemplary wireless communication transmitter is disclosed. The exemplary wireless communication transmitter includes a digital modulator, a computation circuit, a clock generator, and a plurality of digital signal processing circuits. The digital modulator is arranged to generate a digital input which carries in-phase channel information and quadrature channel information in a Cartesian domain. The computation circuit is arranged to process the in-phase channel information and the quadrature channel information, and accordingly generate an amplitude modulation signal and a phase modulation signal in a polar domain. The clock generator is arranged to generate a plurality of non-overlapping clock signals having a same frequency but different phases. Each of the digital signal processing circuits includes a combining stage and an output stage. The combining stage is arranged to receive the non-overlapping clock signals, receive a plurality of input bit streams each derived from the same amplitude modulation signal, and generate an output bit stream by combining the input bit streams according to the non-overlapping clock signals. The output stage is arranged to generate an output signal to an output port of the wireless communication transmitter according to the output bit stream.

According to a seventh aspect of the present invention, an exemplary wireless communication transmitter is disclosed. The exemplary wireless communication transmitter includes a digital modulator, a computation circuit, a clock generator, a selector, and a plurality of digital signal processing circuits. The digital modulator is arranged to generate a digital input which carries in-phase channel information and quadrature channel information in a Cartesian domain. The computation circuit is arranged to process the in-phase channel information and the quadrature channel information, and accordingly generate a phase modulation signal in a polar domain. The clock generator is arranged to generate a plurality of non-overlapping clock signals having a same frequency but different phases, wherein when receiving the phase modulation signal generated from the computation circuit, the clock generator further refers to the phase modulation signal to generate the non-overlapping clock signals. The selector has a first input port arranged to receive the digital input, a second input port arranged to receive a preset digital input, and an output port selectively coupled to the first input port or the second input port. Each of the digital signal processing circuits includes a combining stage and an output stage. The combining stage is arranged to receive the non-overlapping clock signals, receive a plurality of input bit streams derived from an output of the selector, and generate an output bit stream by combining the input bit streams according to the non-overlapping clock signals. The output stage is arranged to generate an output signal to an output port of the wireless communication transmitter according to the output bit stream.

According to an eighth aspect of the present invention, an exemplary wireless communication transmitter is disclosed. The exemplary wireless communication transmitter includes a digital modulator, a computation circuit, a clock generator, a first selector, a second selector, and a plurality of digital signal processing circuits. The digital modulator is arranged to generate a digital input which carries in-phase channel information and quadrature channel information in a Cartesian domain. The computation circuit is arranged to process the in-phase channel information and the quadrature channel information, and accordingly generate an amplitude modulation signal and a phase modulation signal in a polar domain. The clock generator is arranged to generate a plurality of non-overlapping clock signals having a same frequency but different phases, wherein when receiving the phase modulation signal generated from the computation circuit, the clock generator further refers to the phase modulation signal to generate the non-overlapping clock signals. The first selector has a first input port arranged to receive the digital input, a second input port arranged to receive the amplitude modulation signal, and an output port selectively coupled to the first input port of the first selector or the second input port of the first selector. The second selector has a first input port arranged to receive an output of the first selector, a second input port arranged to receive a preset digital input, and an output port selectively coupled to the first input port of the second selector or the second input port of the second selector. Each of the digital signal processing circuits includes a combining stage and an output stage. The combining stage is arranged to receive the non-overlapping clock signals, receive a plurality of input bit streams derived from an output of the second selector, and generate an output bit stream by combining the input bit streams according to the non-overlapping clock signals. The output stage is arranged to generate an output signal to an output port of the wireless communication transmitter according to the output bit stream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
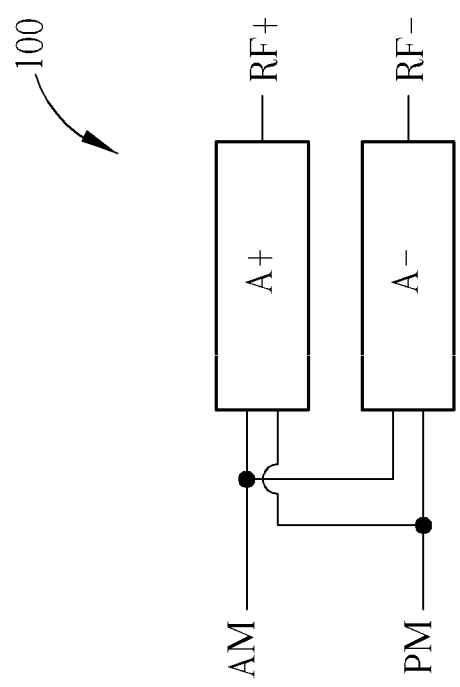
FIG. 1 is a diagram illustrating a conventional digital polar transmitter having power amplifiers implemented in two silicon areas.
Figure 3:
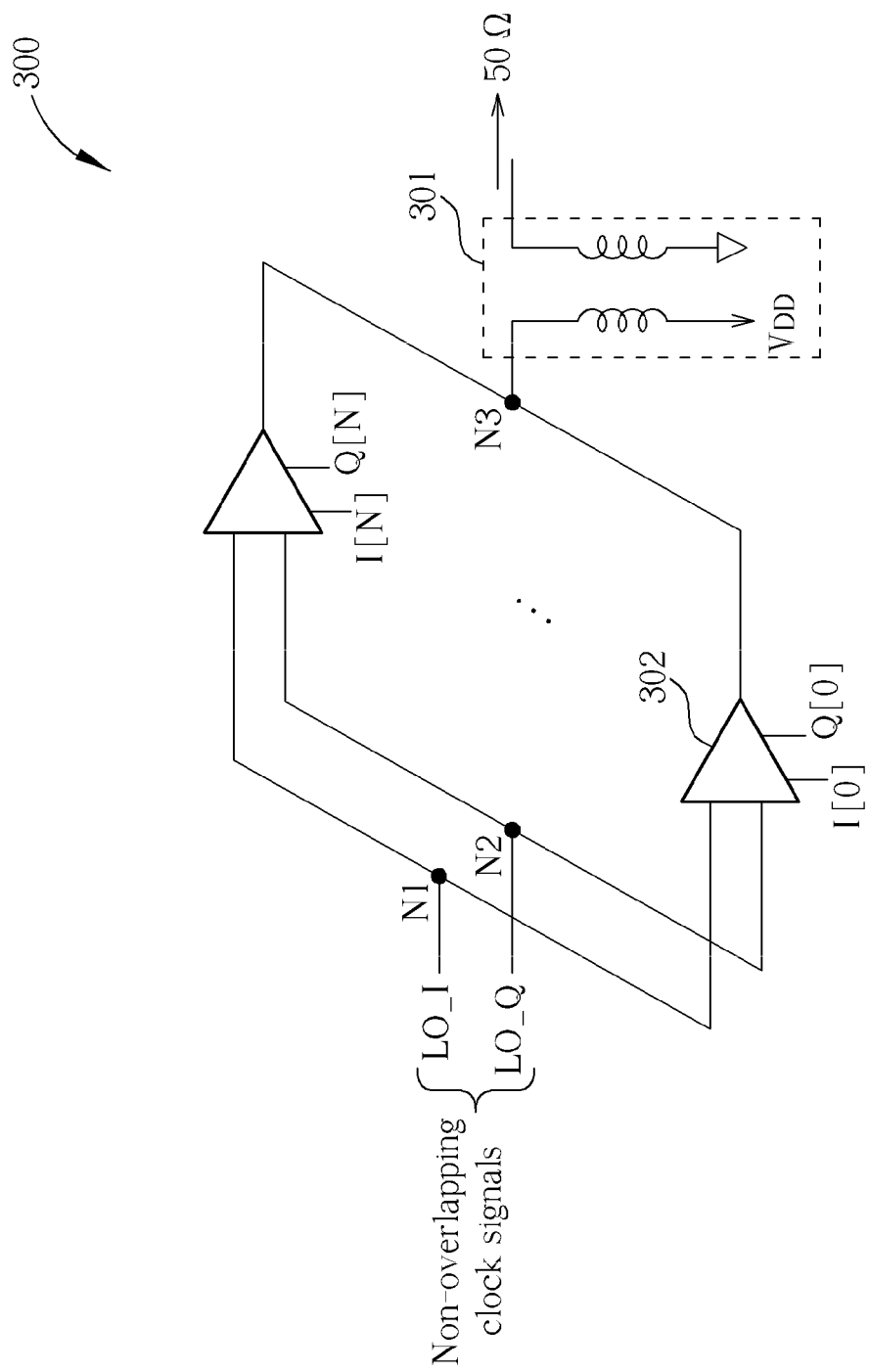
FIG. 3 is a diagram illustrating a generalized digital transmitting circuit according to an exemplary embodiment of the present invention.

Please refer to FIG. 3, which is a diagram illustrating a generalized digital transmitting circuit according to an exemplary embodiment of the present invention. The digital transmitting circuit 300 is a digital IQ processing-based transmitter, and has an input port and an output port. As shown in FIG. 1, the input port includes a first input node N1 and a second input node N2 for receiving non-overlapping clock signals (e.g., LO_I and LO_Q), and the output port includes an output node N3 for generating an output signal S_OUT to a load device 301 such as an inductive load or a balun. As shown in FIG. 3, the digital transmitting circuit 300 includes a plurality of digital signal processing circuits 302 arranged in a parallel connection fashion. Each of the digital signal processing circuits 302 may act as a DAC for converting a single bit of the in-phase channel information I[0]-I[N] and a single bit of the quadrature channel information Q[0]-Q[N] into an analog output at the output node N3. Please note the non-overlapping clock signals LO_I and LO_Q generated from a clock generator (not shown) have the same frequency but different phases. By way of example, but not limitation, the non-overlapping clock signals LO_I and LO_Q have a 90-degree phase difference therebetween, and each of the non-overlapping clock signals LO_I and LO_Q has a duty cycle of 25%. Please note that any clock generator capable of generating the desired non-overlapping clock signals can be used.

As the in-phase LO input (e.g., LO_I) and the quadrature LO input (e.g., LO_Q) have non-overlapping signal pulses, the processing of the in-phase channel information I[0]-I[N] and the processing of the quadrature channel information Q[0]-Q[N] do not occur at the same time. Thus, hardware reuse of the power transistors is allowed to be employed for improving the power efficiency as well as the silicon area usage efficiency. In addition, as the digital transmitting circuit 300 adopts the IQ processing-based transmitter topology, the CORDIC needed by a polar transmitter topology and the signal degradation problem encountered by the polar transmitter topology can be avoided.

Figure 4:
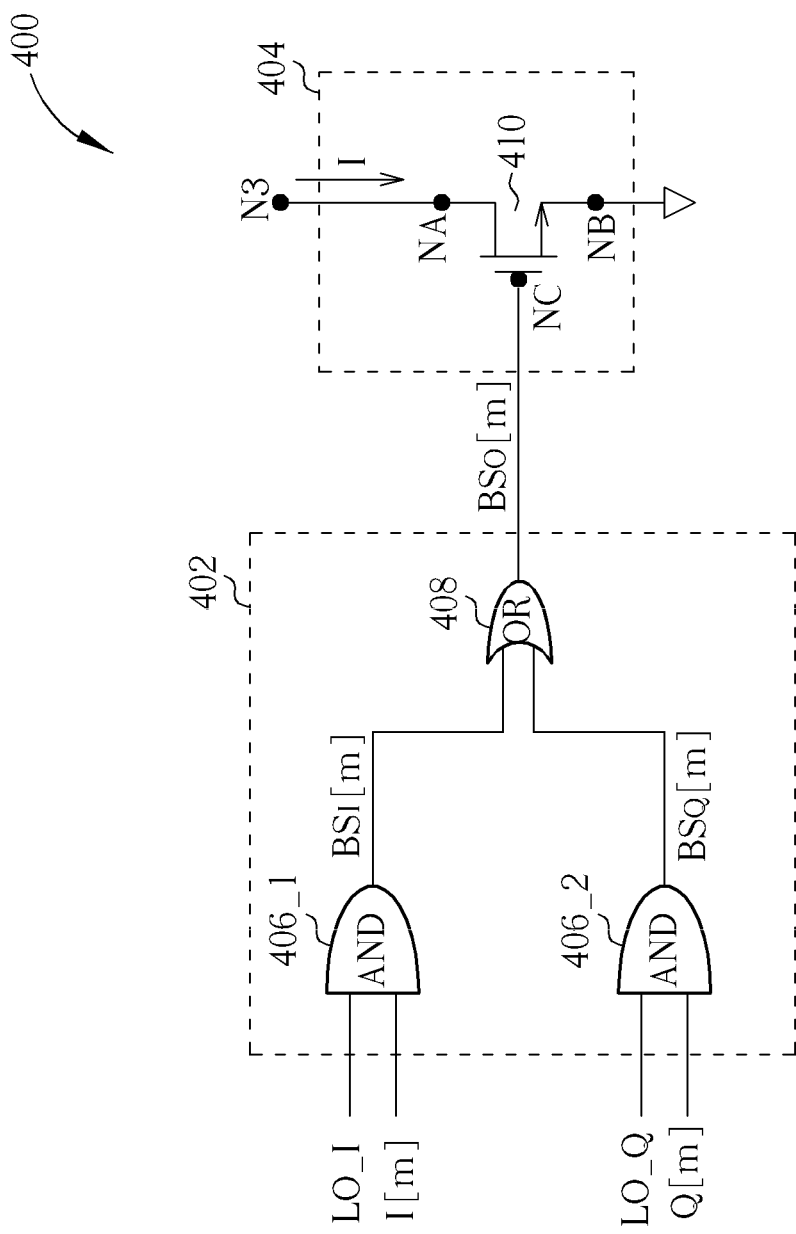
FIG. 4 a diagram illustrating an exemplary implementation of a digital signal processing circuit shown in FIG. 3.

Please refer to FIG. 4, which is a diagram illustrating an exemplary implementation of one digital signal processing circuit shown in FIG. 3. For example, digital signal processing circuits 302 shown in FIG. 3 have the same circuit structure. Therefore, each of the digital signal processing circuits 302 may be implemented by the exemplary digital signal processing circuit 400 shown in FIG. 4. The digital signal processing circuit 400 includes a combining stage 402 and an output stage 404. In this exemplary embodiment, the combining stage 402 includes, but is not limited to, a plurality of first logic units 406_1, 406_2 and a second logic unit 408, and the output stage 404 includes, but is not limited to, a power transistor 410. The first logic units 406_1 and 406_2 are arranged to receive non-overlapping clock signals LO_I and LO_Q having a same frequency but different phases, respectively, receive a plurality of input bit streams I[m] and Q[m], respectively, and generate a plurality of output bit streams $BS_I[m]$ and $BS_Q[m]$ according to the received non-overlapping clock signals LO_I, LO_Q and the received input bit streams I[m], Q[m], respectively. Specifically, the first logic unit 406_1 generates the output bit stream $BS_I[m]$ by performing a first logic operation upon a received non-overlapping clock signal LO_I and a received input bit stream I[m], and the first logic unit 406_2 generates the output bit stream $BS_Q[m]$ by performing the first logic operation upon a received non-overlapping clock signal LO_Q and a received input bit stream Q[m]. Regarding the second logic unit 408, it is arranged to receive the output bit streams $BS_I[m]$ and $BS_Q[m]$, and generate an output bit stream $BS_O[m]$ by performing a second logic operation upon the received first output bit streams $BS_I[m]$ and $BS_Q[m]$.

The power transistor 410 has a control terminal NC (e.g., a gate terminal) and a plurality of connection terminals NA and NB (e.g., a drain terminal and a source terminal), wherein the control terminal NC is controlled according to the output bit stream $BS_O[m]$ generated from the preceding combining stage 402, and the connection terminal NA is coupled to the output terminal N3 of digital transmitting circuit's output port. Based on the control bits sequentially applied to the control terminal NC, the current I passing through the power transistor 410 (i.e., the on/off status of the power transistor 410) is representative of an output bit stream. For example, when the output bit stream $BS_O[m]$ delivers bits "0", "1", and "1" in order, the output bit stream presented at the connection node NA would have bits "1", "0", and "1". To put it simply, the current I generated from the power transistor 410 acts as an output signal of the digital signal processing circuit 400.

In one application, a plurality of the aforementioned digital signal processing circuits 302/400 may be employed for realizing an all-digital power amplifier. That is, no additional analog power amplifier is coupled to the output port of the wireless communication transistor 300. In another application, a plurality of the aforementioned digital signal processing circuits 302/400 may be employed for realizing an all-digital modulator. Therefore, an output of the wireless communication transistor 300 is transmitted to an analog power amplifier for signal amplification.

Please note that the first logic units 406_1 and 406_2 alternately output one bit to the second logic unit 408 due to the timing control provided by the non-overlapping clock signals LO_I and LO_Q. Besides, the second logic unit 408 sequentially outputs bits received from the first logic units 406_1 and 406_2 as the output bit stream $BS_O[m]$. Thus, the output stage 404 is shared by different input bit streams I[m] and Q[m] for processing bits derived from the input bit streams I[m] and Q[m]. To achieve above objective, the first logic units 406_1 and 406_2 may be implemented by AND gates (i.e., the aforementioned first logic operation is an AND operation), and the second logic unit 408 may be implemented by an OR gate (i.e., the aforementioned second logic operation is an OR operation). However, this is for illustrative purposes only, and is not meant to a limitation of the present invention. That is, the combining stage 402 may be realized by any combinational logic as long as the same objective of processing the IQ combination sequentially at the control terminal NC of the power transistor 410 in a time domain is achieved. With a proper timing control, improving the power efficiency by hardware reuse of power transistors becomes feasible.

Figure 2:
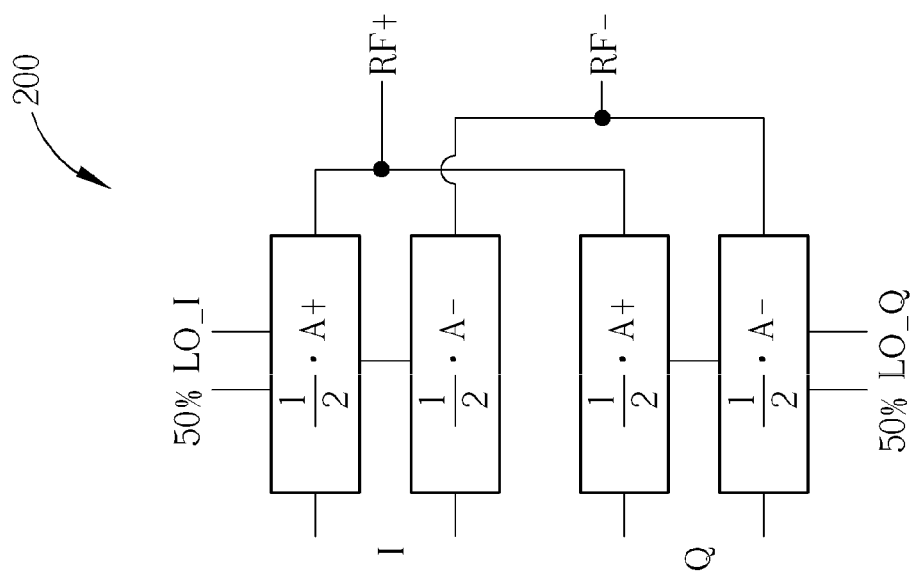
FIG. 2 is a diagram illustrating a conventional I/Q RF DAC having power amplifiers implemented in four smaller silicon areas.
Figure 5:
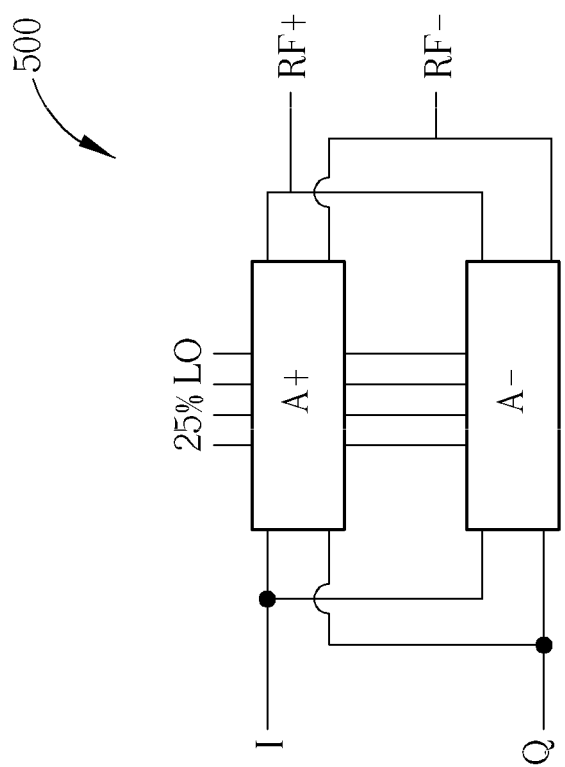
FIG. 5 is a diagram illustrating a simplified digital IQ processing-based transmitter having power amplifiers implemented in two silicon areas according to an exemplary embodiment of the present invention.

Please refer to FIG. 5 in conjunction with FIG. 2. FIG. 5 is a diagram illustrating a simplified digital IQ processing-based transmitter having power amplifiers implemented in two silicon areas A+ and A− according to an exemplary embodiment of the present invention. As the proposed digital IQ processing-based transmitter 500 employs LO inputs (e.g., the aforementioned LO_I and LO_Q) each having a duty cycle of 25%, the LO inputs are non-overlapping clock signals. Due to hardware reuse of power transistors in the proposed digital IQ processing-based transmitter 500, the aforementioned parameter α would be A(t). Supposing that the LO input is implemented by a periodic square wave signal with the same frequency and amplitude, a first-order harmonic term would have a coefficient equal to $$\frac{2\sqrt{2}}{\pi}$$

due to a lower duty cycle (i.e., 25% duty cycle) of the LO input. Therefore, the upmixing power P3 of positive RF signal RF+/negative RF signal RF− generated from the proposed digital IQ processing-based transistor 500 may be expressed as follows.

$$P2 = A(t)e^{j\phi(t)} \times \frac{2\sqrt{2}}{\pi} e^{j\omega_{LO}t} \cong 0.9A(t)e^{j[\omega_{LO}t + \phi(t)]} \quad (3)$$

As can be seen from above equations (2) and (3), the power efficiency of the proposed digital IQ processing-based transistor 500 is similar to that of the conventional I/Q RF DAC 200 under a condition where the respective consumed silicon areas are the same at the first order place, but without the loss due to the cross contamination among quadrature signals due to the non-overlapping and time slicing nature. Also, in the proposed architecture since the silicon area usage is twice that of conventional design at any instantaneous moment for either I or Q signal, the equivalent resolution is increased by 1 bit, and the quantization noise is reduced by 6 dB. In a multi-radio coexisting environment, for example, the embodiment works well since the reduced out-of-band noise floor can ease the desensitization occurred in the receiver of nearby wireless equipments. To put it simply, a wireless communication transmitter using the digital signal processing circuits 400 would have improved both power efficiency and reduced out-of-band noise floor.

Figure 6:
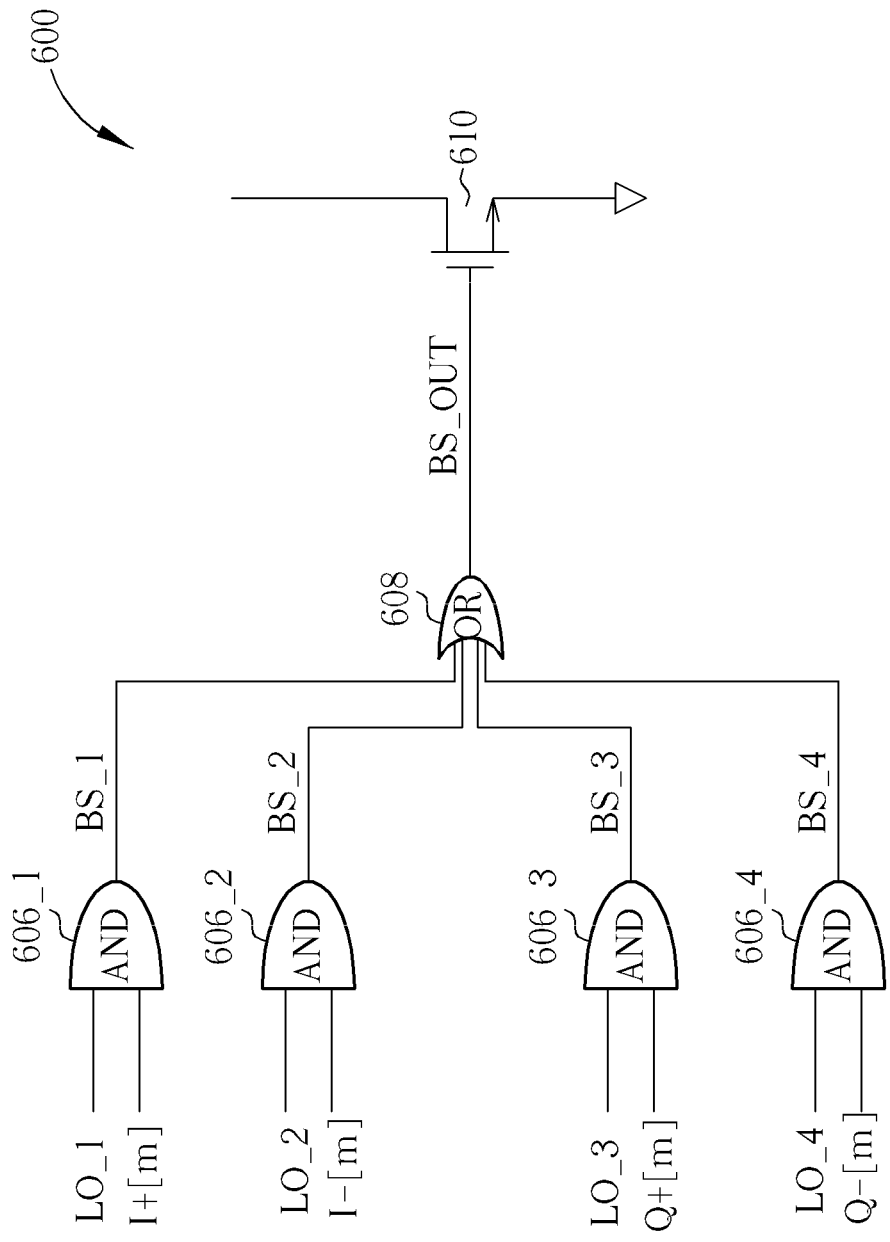
FIG. 6 is a diagram illustrating a single-ended digital signal processing circuit according to an exemplary embodiment of the present invention.
Figure 7:
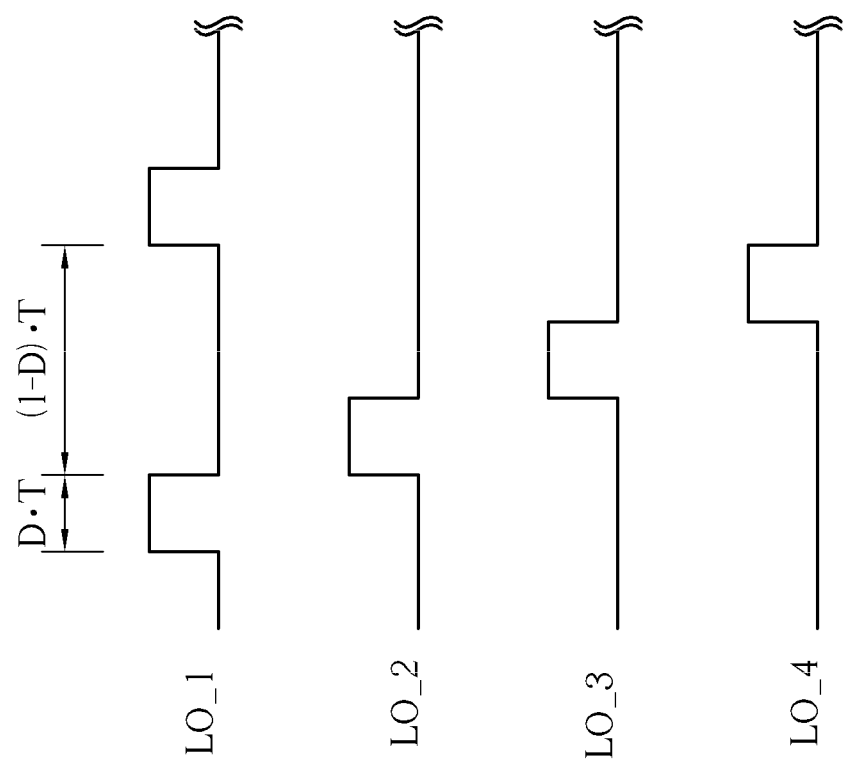
FIG. 7 is a waveform diagram illustrating the non-overlapping clock signals used by the single-ended digital signal processing circuit shown in FIG. 6.

Further details of the proposed digital signal processing circuit are described as follows. Please refer to FIG. 6 in conjunction with FIG. 7. FIG. 6 is a diagram illustrating a single-ended digital signal processing circuit according to an exemplary embodiment of the present invention. FIG. 7 is a waveform diagram illustrating the non-overlapping clock signals used by the single-ended digital signal processing circuit shown in FIG. 6. The single-ended digital signal processing circuit 600 includes a plurality of first logic units (e.g., AND gates) 606_1, 606_2, 606_3, 606_4, a second logic unit (e.g., an OR gate) 608, and a power transistor 610. Non-overlapping clock signals LO_1, LO_2, LO_3, and LO_4 are received by the first logic units 606_1-606_4, respectively. As can be seen from FIG. 7, the non-overlapping clock signals LO_1, LO_2, LO_3, and LO_4 have the same period T, and the duty cycle D of each non-overlapping clock signal is 25% (i.e., D=25%). Moreover, the non-overlapping clock signals LO_1 and LO_2 have a 90-degree phase difference therebetween, the non-overlapping clock signals LO_3 and LO_4 have a 90-degree phase difference therebetween, the non-overlapping clock signals LO_1 and LO_3 have a 180-degree phase difference therebetween, and the non-overlapping clock signals LO_2 and LO_4 have a 180-degree phase difference therebetween. The non-overlapping clock signals LO_1, LO_2, LO_3, and LO_4 may be expressed by following equations.

$$LO\_1(t) = \frac{2}{\pi}\cos(\omega_{LO}t) + \frac{1}{\pi}\cos(2\omega_{LO}t) + \frac{\sqrt{2}}{3\pi}\cos(3\omega_{LO}t) + \ldots \quad (4)$$

$$LO\_2(t) = \frac{\sqrt{2}}{\pi}\sin(\omega_{LO}t) - \frac{1}{\pi}\cos(2\omega_{LO}t) - \frac{\sqrt{2}}{3\pi}\sin(3\omega_{LO}t) + \ldots \quad (5)$$

$$LO\_3(t) = -\frac{\sqrt{2}}{\pi}\cos(\omega_{LO}t) + \frac{1}{\pi}\cos(2\omega_{LO}t) - \frac{\sqrt{2}}{3\pi}\cos(3\omega_{LO}t) + \ldots \quad (6)$$

$$LO\_4(t) = -\frac{\sqrt{2}}{\pi}\sin(\omega_{LO}t) - \frac{1}{\pi}\cos(2\omega_{LO}t) + \frac{\sqrt{2}}{3\pi}\cos(3\omega_{LO}t) + \ldots \quad (7)$$

In this exemplary embodiment, the duty cycle D is 25%. However, this is not meant to be a limitation of the present invention. In an alternative design, using non-overlapping clock signals with duty cycles different from 25% is feasible.

As shown in FIG. 6, the single-ended digital signal processing circuit 600 receives a first differential input bit stream including an input bit stream I+[m] and an input bit stream I−[m] which carry in-phase channel information, and further receives a second differential input bit stream including an input bit stream Q+[m] and an input bit stream Q−[m] which carry quadrature channel information. For simplicity, it is assumed that each of the input bit streams I+[m] and I−[m] corresponds to a sine wave signal with a baseband frequency $\omega_{BB}$, and each of the input bit streams Q+[m] and Q−[m] corresponds to a cosine wave signal with the same baseband frequency $\omega_{BB}$. Therefore, the outputs BS_1, BS_2, BS_3, and BS_4 of the first logic units 606_1-606_4 may be expressed as follows.

$$BS\_1(t) = LO\_1(t) \times \sin(\omega_{BB}t) \quad (8)$$

$$BS\_2(t) = LO\_2(t) \times \cos(\omega_{BB}t) \quad (9)$$

$$BS\_3(t) = LO\_3(t) \times [-\sin(\omega_{BB}t)] \quad (10)$$

$$BS\_4(t) = LO\_4(t) \times [-\cos(\omega_{BB})] \quad (11)$$

As the outputs BS_1-BS_4 of the first logic units 606_1-606_4 are merged/combined at the second logic unit 608, the output BS_OUT of the second logic unit 608 can be expressed as follows.

$$BS\_OUT(t) = BS\_1(t) + BS\_2(t) + BS\_3(t) + BS\_4(t) = \quad (12)$$

$$\left[\frac{2}{\pi}\cos(\omega_{LO}t) + \frac{1}{\pi}\cos(2\omega_{LO}t) + \frac{\sqrt{2}}{2\pi}\cos(3\omega_{LO}t) + \ldots\right] \times$$

$$\sin(\omega_{BB})t + \left[\frac{\sqrt{2}}{\pi}\sin(\omega_{LO}t) - \frac{1}{\pi}\cos(2\omega_{LO}t) - \frac{\sqrt{2}}{3\pi}\sin(3\omega_{LO}t) + \ldots\right] \times \cos(\omega_{BB}t) +$$

$$\left[-\frac{\sqrt{2}}{\pi}\cos(\omega_{LO}t) + \frac{1}{\pi}\cos(2\omega_{LO}t) - \frac{\sqrt{2}}{3\pi}\cos(3\omega_{LO}t) + \ldots\right] \times$$

$$[-\sin(\omega_{BB}t)] + \left[-\frac{\sqrt{2}}{\pi}\sin(\omega_{LO}t) - \frac{1}{\pi}\cos(2\omega_{LO}t) + \frac{\sqrt{2}}{3\pi}\cos(3\omega_{LO}t) + \ldots\right] \times [-\cos(\omega_{BB}t)] =$$

$$\frac{2\sqrt{2}}{\pi}\sin(\omega_{LO+BB}t) - \frac{2\sqrt{2}}{3\pi}\sin(\omega_{3LO-BB}t) + \ldots$$

As can be seen from above equation (12), the output BS_OUT to be transmitted would have a desired signal component having the RF frequency (i.e., $$\frac{2\sqrt{2}}{\pi}\sin(\omega_{LO+BB}t)),$$

which implies that the proposed digital signal processing circuit does have the capability of up-converting the incoming baseband signal to a desired RF signal for radio transmission.

Figure 8:
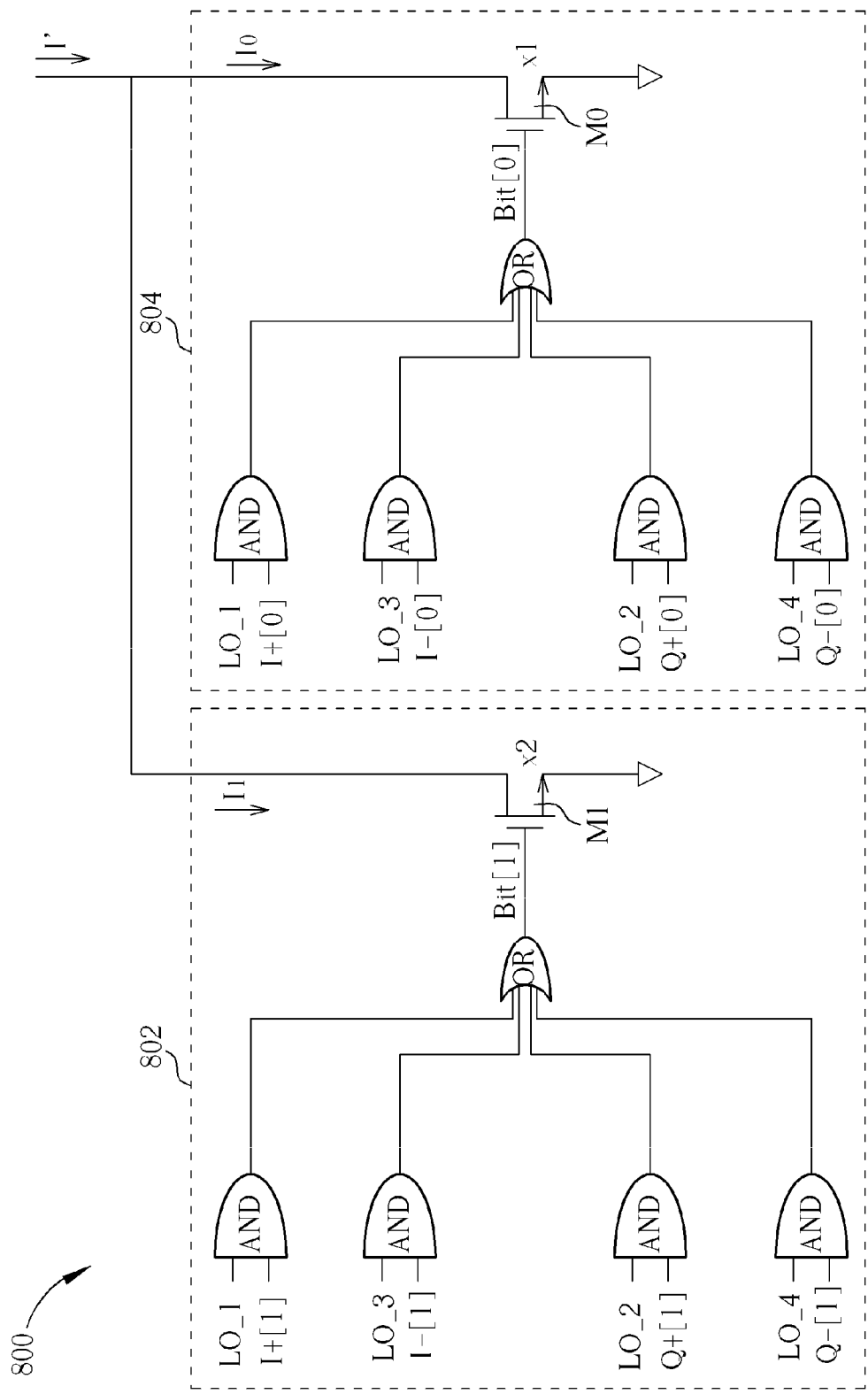
FIG. 8 is a diagram illustrating a digital transmitting circuit using two digital signal processing circuits according to an exemplary embodiment of the present invention.
Figure 9:
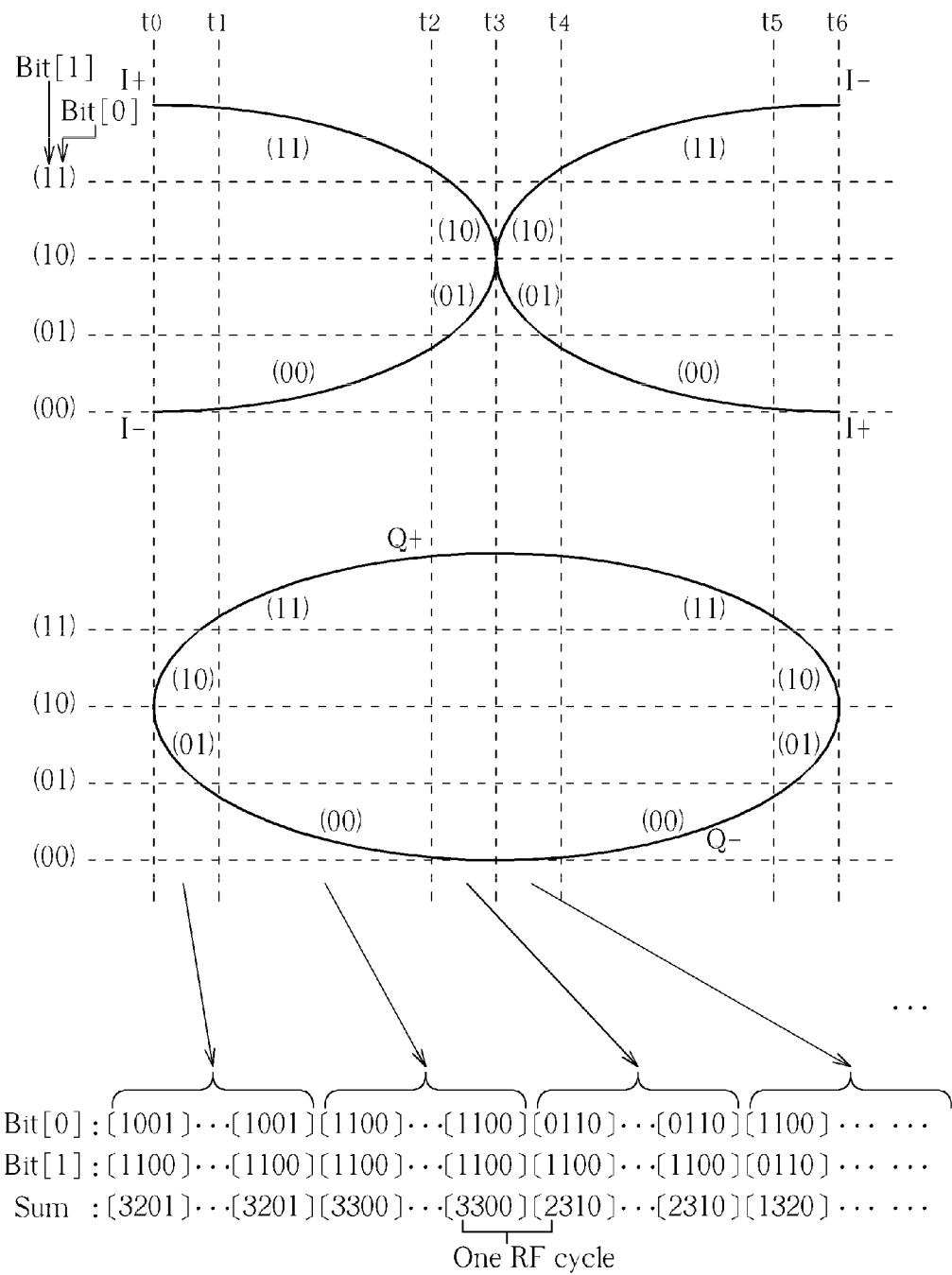
FIG. 9 is a diagram of the input bit streams processed by the digital transmitting circuit shown in FIG. 8.

A wireless communication transmitter using two proposed digital signal processing circuits is detailed hereinafter for better understanding of technical features of the present invention. Please refer to FIG. 8 in conjunction with FIG. 9. FIG. 8 is a diagram illustrating a digital transmitting circuit using two digital signal processing circuits according to an exemplary embodiment of the present invention. FIG. 9 is a diagram of the input bit streams processed by the digital transmitting circuit shown in FIG. 8. In this exemplary embodiment, each in-phase signal power is quantized and represented by Bit[1] and Bit[0], and each quadrature signal power is also quantized and represented by Bit[1] and Bit[0]. Thus, the in-phase signal/quadrature signal may have four possible power levels defined by binary digits of Bit[1] and Bit[0]. Please note that the size of the power transistor M1 in the digital signal processing circuit 802 is twice as large as that of the power transistor M0 in the digital signal processing circuit 804. As the power transistors M0 and M1 are controlled by Bit[0] and Bit[1], respectively, the current I' generated from combining currents $I_0$ and $I_1$ of the power transistors M0 and M1 would have four possible current values (i.e., 0+0, $I_0$+0, 0+$I_1$, $I_0$+$I_1$) corresponding to four possible power levels, respectively.

As can be seen from FIG. 8, Bit[0] generated from the OR gate of the digital signal processing circuit 804 would be sequentially set by I+[0], Q+[0], I−[0], and Q−[0] due to the non-overlapping clock phase relationship shown in FIG. 7. Similarly, Bit[1] generated from the OR gate of the digital signal processing circuit 802 would be sequentially set by I+[1], Q+[1], I−[1], and Q−[1] due to the non-overlapping clock phase relationship shown in FIG. 7. In accordance with the timing diagram shown in FIG. 9, the binary digits of Bit[1] and Bit[0] during different time intervals can be briefly summarized by the following tables.

TABLE 0

(Bit[0]):

| | I + [0] | Q + [0] | I − [0] | Q − [0] |
|---|---|---|---|---|
| t0-t1 | 1 | 0 | 0 | 1 |
| t1-t2 | 1 | 1 | 0 | 0 |
| t2-t3 | 0 | 1 | 1 | 0 |
| t3-t4 | 1 | 1 | 0 | 0 |
| t4-t5 | 0 | 1 | 1 | 0 |
| t5-t6 | 0 | 0 | 1 | 1 |

TABLE 1

(Bit[1]):

| | I + [1] | Q + [1] | I − [1] | Q − [1] |
|---|---|---|---|---|
| t0-t1 | 1 | 1 | 0 | 0 |
| t1-t2 | 1 | 1 | 0 | 0 |
| t2-t3 | 1 | 1 | 0 | 0 |
| t3-t4 | 0 | 1 | 1 | 0 |
| t4-t5 | 0 | 1 | 1 | 0 |
| t5-t6 | 0 | 1 | 1 | 0 |

In this exemplary embodiment, the in-phase signal is a sine wave signal and the quadrature signal is a cosine wave signal (i.e., both of the in-phase signal and the quadrature signal are periodic baseband signals each having a baseband cycle corresponding to a plurality of RF cycles). Therefore, bit patterns generated at output nodes of the OR gates in the digital signal processing circuits 802, 804 will be repeated cyclically, as shown in FIG. 9. In addition, as the sum of Bit[0] and Bit[1] is representative of the power level, the power level of the RF signal transmitted from the digital transmitting circuit 800 will be repeated cyclically, too.

Figure 10:
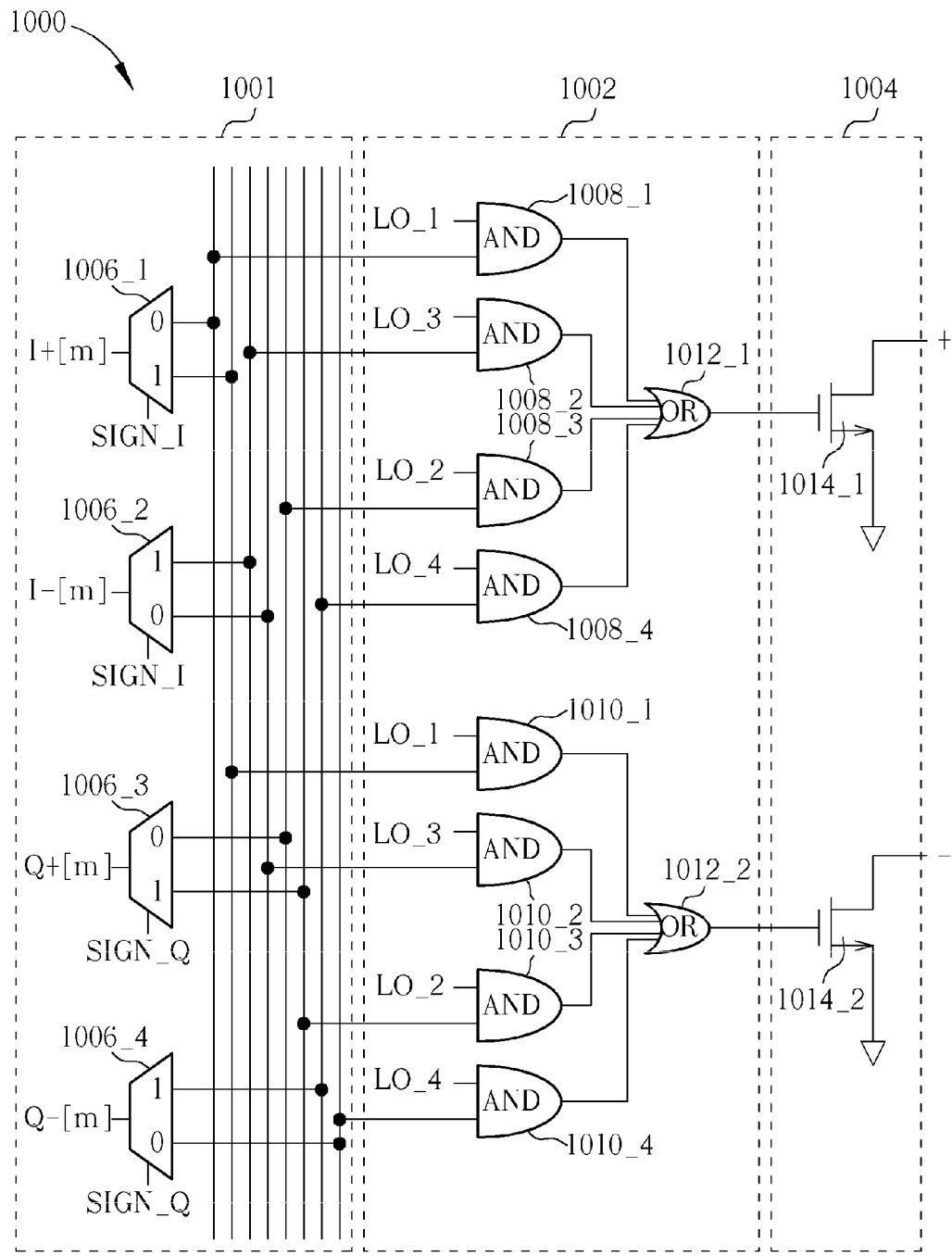
FIG. 10 is a diagram illustrating a differential digital signal processing circuit according to an exemplary embodiment of the present invention.

In addition to a single-ended application, the proposed digital signal processing circuit may be employed in a differential application. Please refer to FIG. 10, which is a diagram illustrating a differential digital signal processing circuit according to an exemplary embodiment of the present invention. The differential digital signal processing circuit 1000 includes a decoder 1001, a combining stage 1002, and an output stage 1004. In this exemplary embodiment, the decoder 1001 includes a plurality of selectors 1006_1, 1006_2, 1006_3, and 1006_4; the combining stage 1002 includes a plurality of first logic units (e.g., AND gates) 1008_1-1008_4, a plurality of third logic units (e.g., AND gates) 1010_1-1010_4, a second logic unit (e.g., an OR gate) 1012_1, and a fourth logic unit (e.g., an OR gate) 1012_2; and the output stage 1004 includes a plurality of power transistors 1014_1 and 1014_2 for outputting a differential output. As shown in FIG. 10, the decoder 1001 receives a first differential input bit stream including an input bit stream I+[m] and an input bit stream I−[m] which carry in-phase channel information, and further receives a second differential input bit stream including an input bit stream Q+[m] and an input bit stream Q−[m] which carry quadrature channel information. Please note that one bit of the input bit stream I+[m] and one bit of the input bit stream I−[m] correspond to part of an in-phase data to be processed (e.g., $(m+1)^{th}$ bit of the in-phase data to be processed), and one bit of the input bit stream Q+[m] and one bit of the input bit stream Q−[m] correspond to part of a quadrature data to be processed (e.g., $(m+1)^{th}$ bit of the quadrature data to be processed). Taking the embodiment shown in FIG. 3 for example, one in-phase data/quadrature data includes (N+1) bits that are transmitted to the (N+1) digital signal processing circuits 302, respectively. Regarding the differential architecture shown in FIG. 10, the decoder 1001 is arranged to decode received bits respectively transmitted via the input bit streams I+[m], I−[m], Q+[m], and Q−[m] for dispatching bits arrived at the selectors 1006_1-1006_4 to the first logic units 1008_1-1008_4 and the third logic units 1010_1-1010_4 by. For example, when a sign bit SIGN_I of the in-phase data has a first binary digit (e.g., "0"), one bit received by the selector 1006_1 is transmitted to the first logic unit 1008_1, and one bit received by the selector 1006_2 is transmitted to the third logic gate 1010_2; and when the sign bit SIGN_I of the in-phase data has a second binary digit (e.g., "1"), one bit received by the selector 1006_1 is transmitted to the third logic unit 1010_1, and one bit received by the selector 1006_2 is transmitted to the first logic gate 1008_2. Please note that the non-overlapping clock LO_I fed into the first logic unit 1008_1 and third logic unit 1010_1 and the non-overlapping clock signal LO_3 fed into the first logic units 1008_2 and third logic 1010_2 have a 180-degree phase difference therebetween. Similarly, when a sign bit SIGN_Q of the quadrature data has the first binary digit (e.g., "0"), one bit received by the selector 1006_3 is transmitted to the first logic unit 1008_3, and one bit received by the selector 1006_4 is transmitted to the third logic gate 1010_4; and when the sign bit SIGN_Q of the quadrature data has the second binary digit (e.g., "1"), one bit received by the selector 1006_3 is transmitted to the third logic unit 1010_3, and one bit received by the selector 1006_4 is transmitted to the first logic gate 1008_4. Please note that the non-overlapping clock LO_2 fed into the first logic unit 1008_3 and third logic unit 1010_3 and the non-overlapping clock LO_4 fed into the first logic unit 1008_4 and third logic unit 1010_4 have a 180-degree phase difference therebetween. As a person skilled in the art can readily understand operations of the combining stage 1002 and the output stage 1004 after reading above paragraphs, further description is omitted here for brevity. As the bits decoded by the decoder 1001 are properly dispatched to the first and third logic units included in the following combining stage 1102 by referring to the sign bits of the in-phase data and the quadrature data, a differential output is therefore generated from the power transistors 1014_1 and 1014_2.

Figure 11:
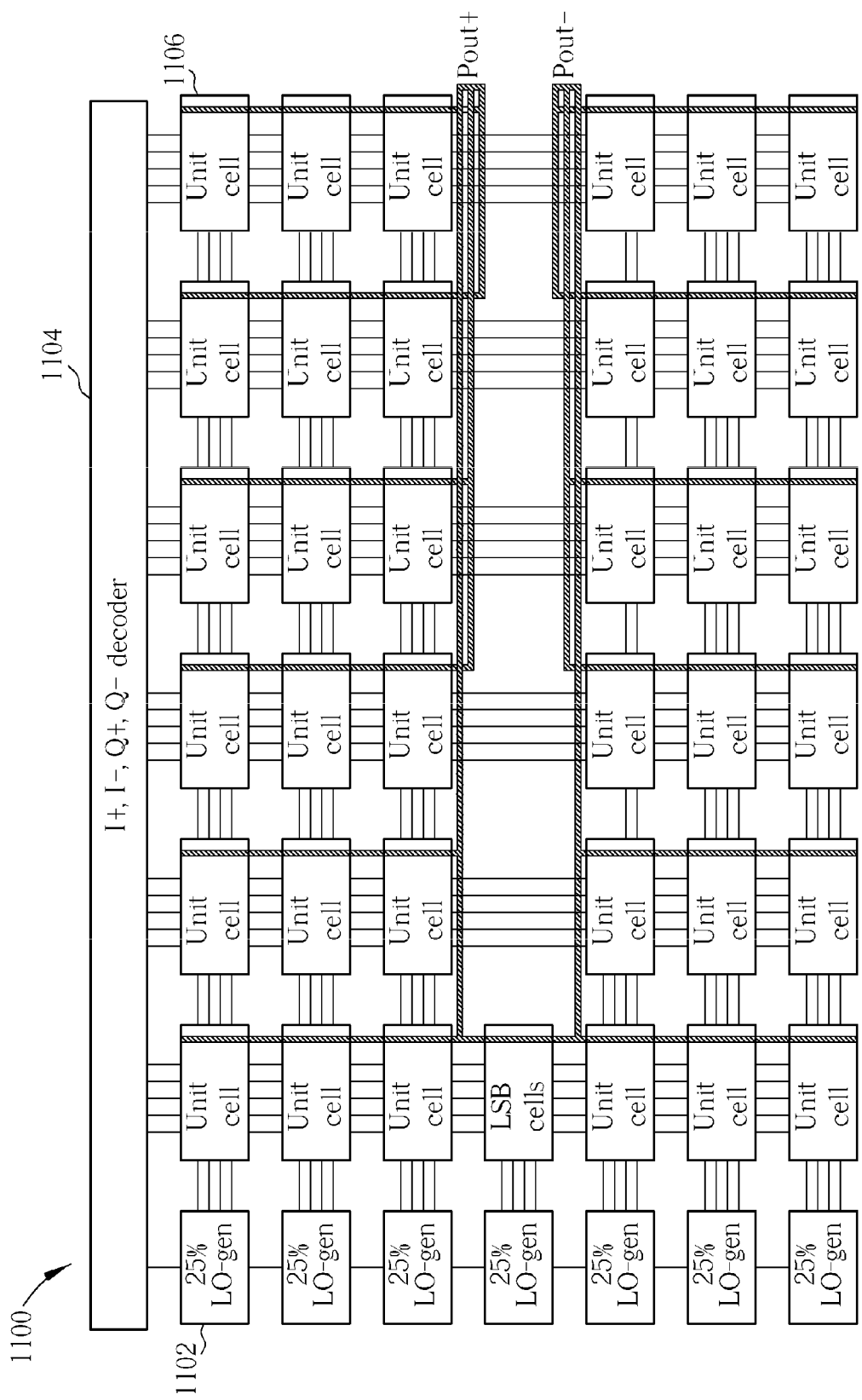
FIG. 11 is a diagram illustrating an exemplary design of a digital IQ processing-based transmitting circuit according to the present invention.

The combination of the combining stage 1002 and the output stage 1004 shown in FIG. 10 may serve as one unit cell for building a digital IQ processing-based transmitting circuit. Please refer to FIG. 11, which is a diagram illustrating an exemplary design of a digital IQ processing-based transmitting circuit according to the present invention. The digital IQ processing-based transmitting circuit 1100 generates a differential output including Pout+ and Pout−, and includes a plurality of LO generators 1102 each generating non-overlapping clocks (e.g., LO signals each having a duty cycle of 25%), a decoder 1104 for decoding bits received from in-phase channels I+, I− and quadrature channel Q+, Q−, and a plurality of unit cells 1106 each may be implemented by a combination of the combining stage 1002 and the output stage 1004 shown in FIG. 10. As can be seen from FIG. 11, the LO generators 1102 and unit cells 1106 are arranged in a matrix format. That is, in this exemplary design, each LO generator (Lo-gen) 1102 is integrated in the transmitting circuit as a "bank" unit. As a person skilled in the art can readily understand details of the decoder 1104 and the unit cells 1106 after reading above paragraphs directed to the differential architecture shown in FIG. 10, further description is omitted here for brevity.

Figure 12:
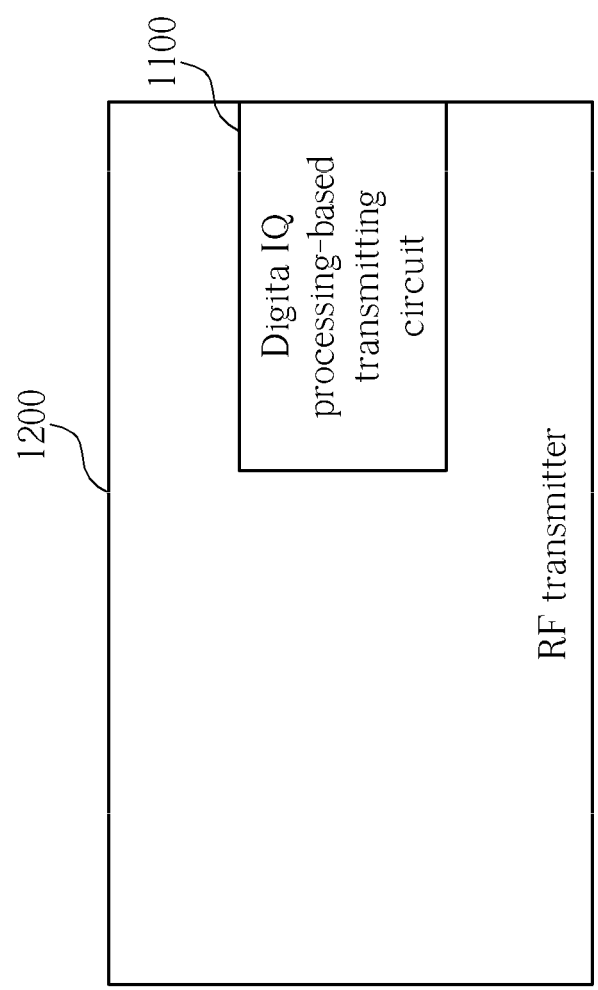
FIG. 12 is a diagram illustrating an RF transmitter using the digital IQ processing-based transmitting circuit shown in FIG. 11 as an all-digital power amplifier.
Figure 13:
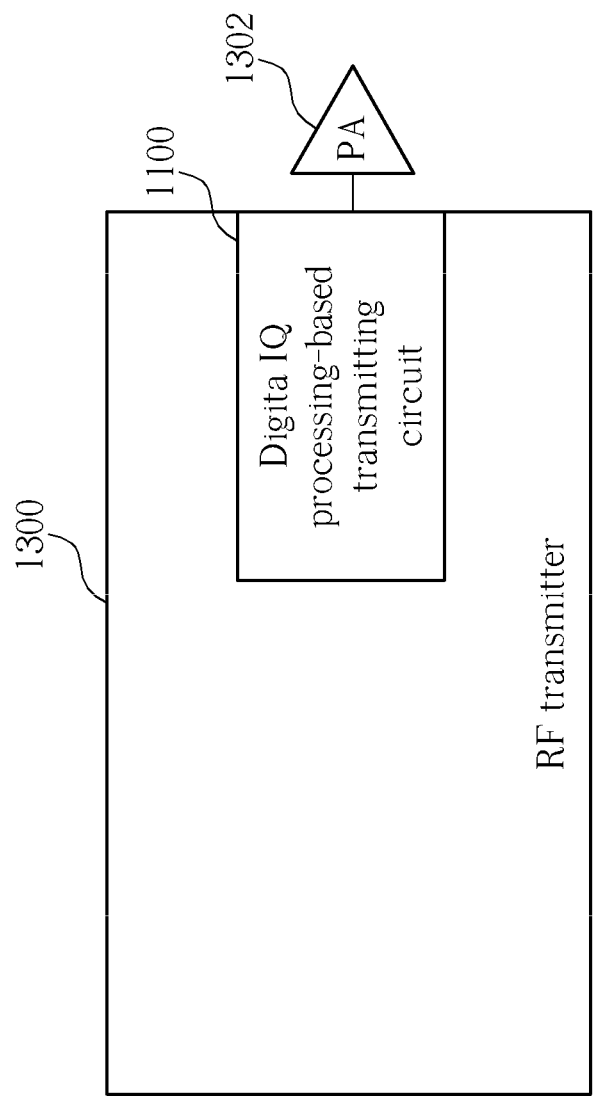
FIG. 13 is a diagram illustrating an RF transmitter using the digital IQ processing-based transmitting circuit shown in FIG. 11 as an all-digital modulator.

The aforementioned digital IQ processing-based transmitting circuit 1100 may act as an all-digital power amplifier or an all-digital modulator, depending upon actual design requirement/consideration. Please refer to FIG. 12 in conjunction with FIG. 13. FIG. 12 is a diagram illustrating an RF transmitter 1200 using the digital IQ processing-based transmitting circuit 1100 as an all-digital power amplifier. FIG. 13 is a diagram illustrating an RF transmitter 1300 using the digital IQ processing-based transmitting circuit 1100 as an all-digital modulator. Therefore, an output of the digital IQ processing-based transmitting circuit 1100 is transmitted to an analog power amplifier (PA) 1302 for signal amplification.

Figure 14:
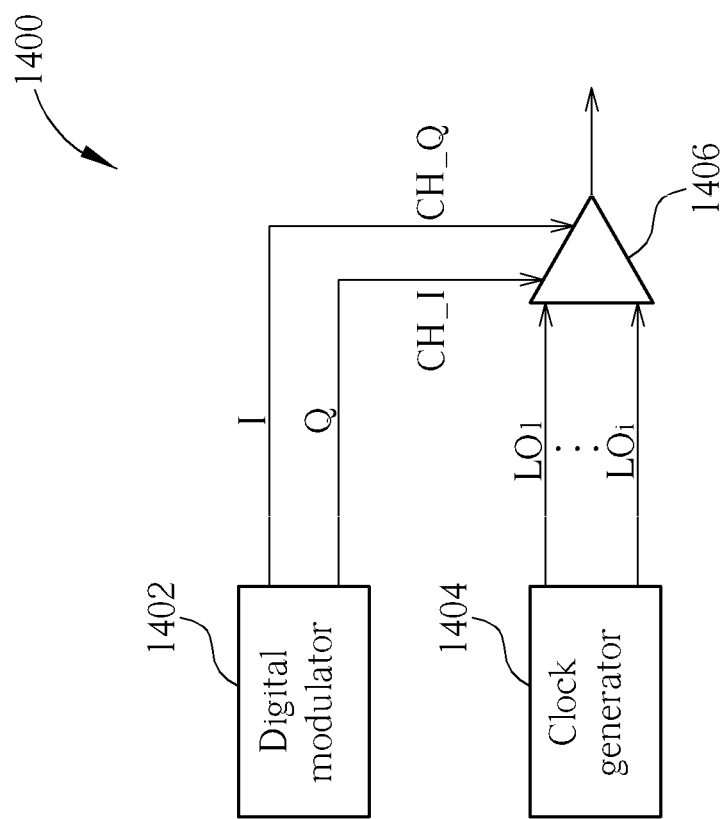
FIG. 14 is a diagram illustrating a wireless communication transmitter with a Cartesian configuration according to an exemplary embodiment of the present invention.

A Cartesian configuration is widely used a variety of wireless communication applications. Please refer to FIG. 14, which is a diagram illustrating a wireless communication transmitter with a Cartesian configuration according to an exemplary embodiment of the present invention. The wireless communication transmitter 1400 includes, but is not limited to, a digital modulator 1402, a clock generator 1410, and a digital transmitting circuit 1406. The clock generator 1404 is arranged to generate a plurality of non-overlapping clock signals $LO_0$-$LO_i$ having a same frequency but different phases. For example, the clock generator 1404 may be implemented by an all-digital phase-locked loop (ADPLL), and the non-overlapping clock signals LO_1, LO_2, LO_3, and LO_4 shown in FIG. 7 are generated from the clock generator 1404 to the digital transmitting circuit 1406. The digital modulator 1402 is arranged to generate a digital input to the digital transmitting circuit 1406 via the in-phase bus CH_I and quadrature bus CH_Q, wherein the digital input carries in-phase channel information I and quadrature channel information Q in a Cartesian domain. The digital transmitting circuit 1406 includes a plurality of digital signal processing circuits. For example, each of the digital signal processing circuit may be implemented by one of the aforementioned single-ended digital transmitting circuit/differential digital transmitting circuit. Thus, further description of the digital transmitting circuit 1406 is omitted here for brevity. By way of example, but not limitation, the wireless communication transmitter 1400 may be implemented in a WCDMA application, a WiFi application, a WiMAX application, an LTE application, a GSM application, an EDGE application, or a Bluetooth application.

Figure 15:
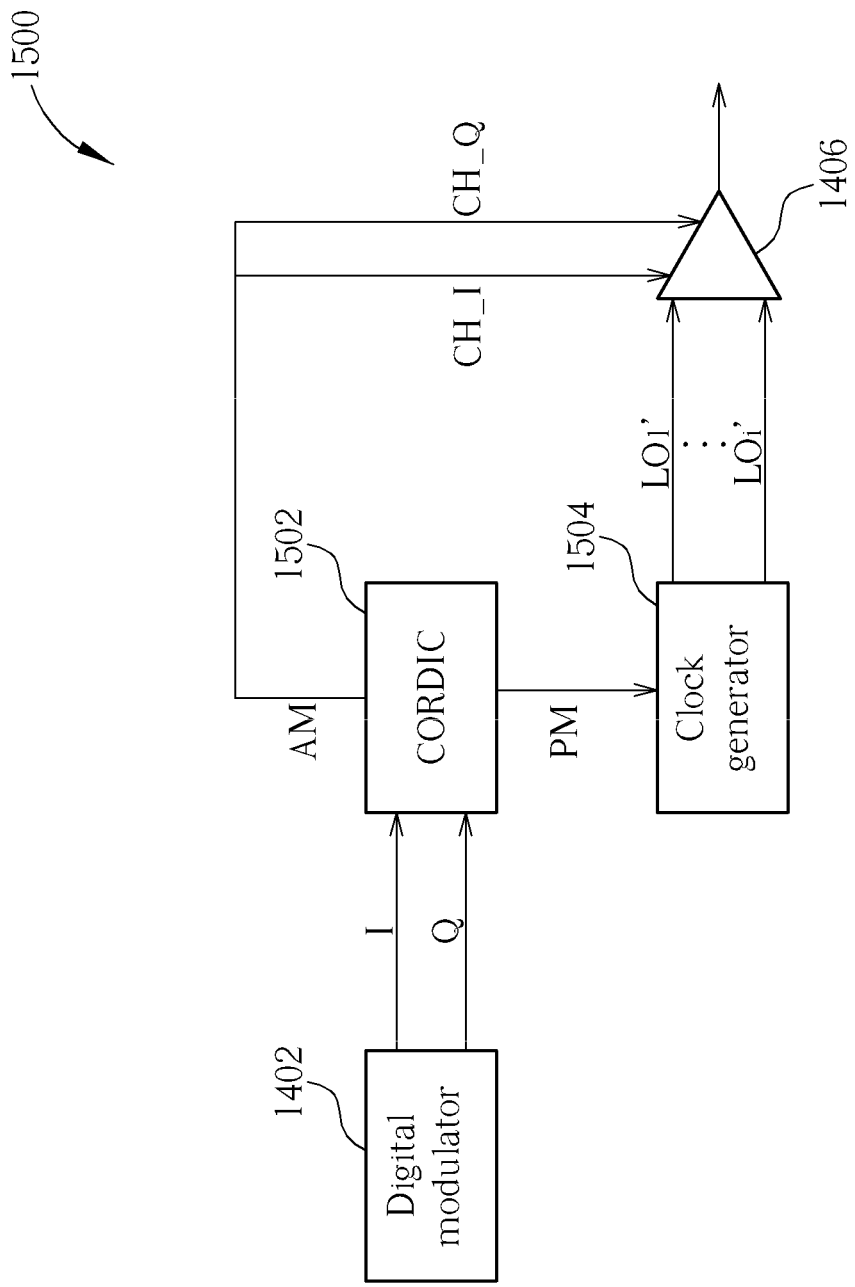
FIG. 15 is a diagram illustrating a wireless communication transmitter with a polar configuration according to an exemplary embodiment of the present invention.

Compared to the Cartesian configuration, a polar configuration has higher power/current efficiency. The aforementioned single-ended digital transmitting circuit/differential digital transmitting circuit may also be implemented in a polar transmitter by using the same bit stream derived from the amplitude modulation signal as the in-phase data input and the quadrature data input. Please refer to FIG. 15, which is a diagram illustrating a wireless communication transmitter with a polar configuration according to an exemplary embodiment of the present invention. The wireless communication transmitter 1500 includes, but is not limited to, a computation circuit (e.g., a CORDIC 1502), a clock generator 1504, and the aforementioned digital modulator 1402 and digital transmitting circuit 1406. The CORDIC 1502 is arranged to process the in-phase channel information I and the quadrature channel information Q, and accordingly generate an amplitude modulation signal AM and a phase modulation signal PM in a polar domain. The clock generator 1504 is arranged to generate a plurality of non-overlapping clock signals $LO_1'$-$LO_i'$ according to the phase modulation signal PM. For example, the clock generator 1404 may have a frequency deviation calculation circuit and an all-digital phase-locked loop (ADPLL) included therein, wherein the frequency deviation calculation circuit is for processing the phase modulation signal PM to generate a frequency modulation signal used to control the ADPLL. That is, the frequency of the non-overlapping clock signals $LO_1'$-$LO_i'$ would be dynamically adjusted according to the frequency modulation signal derived from the phase modulation signal PM. As can be seen from FIG. 15, input bit streams derived from the amplitude modulation signal AM are used as the input bit streams fed into the digital transmitting circuit 1406. On other words, the in-phase bus CH_I and the quadrature bus CH_Q are both terminated to the amplitude modulation path. For instance, the first logic units 406_1 and 406_2 shown in FIG. 4 receive input bit streams I[m] and Q[m] both derived from the same amplitude modulation signal AM. By way of example, but not limitation, the wireless communication transmitter 1500 may be implemented in a GSM application, an EDGE application, or a Bluetooth application operating under a Basic Data Rate (BDR) mode.

Figure 16:
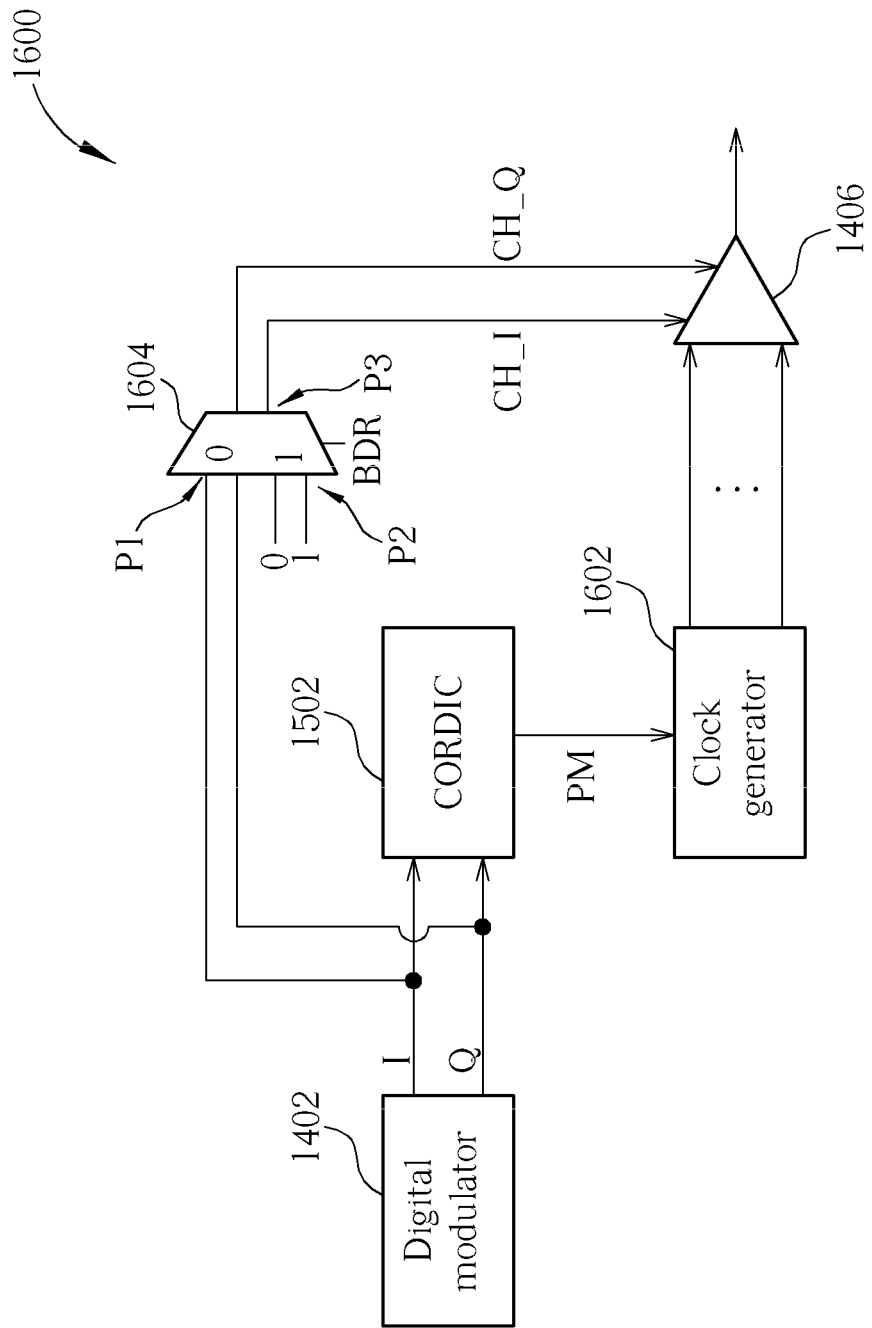
FIG. 16 is a diagram illustrating a wireless communication transmitter with a hybrid configuration according to an exemplary embodiment of the present invention.

Compared to the Cartesian configuration and the polar configuration, a hybrid configuration may be employed for offering power/current efficiency and signal accuracy/integrity on demand. In one exemplary design, the hybrid configuration can switch between a Cartesian configuration and a direct-frequency modulating (DFM) configuration according to actual application requirement. Please refer to FIG. 16, which is a diagram illustrating a wireless communication transmitter with a hybrid configuration according to an exemplary embodiment of the present invention. The wireless communication transmitter 1600 includes, but is not limited to, a clock generator 1602, a selector 1604, and the aforementioned digital modulator 1402, CORDIC 1502, clock generator 1602, and digital transmitting circuit 1406. The clock generator 1602 is arranged to generate a plurality of non-overlapping clock signals having a same frequency but different phases. Moreover, when receiving the phase modulation signal PM generated from the computation circuit (e.g., CORDIC 1502), implying that the hybrid configuration is now switched to the polar configuration, the clock generator further refers to the phase modulation signal PM to generate the non-overlapping clock signals supplied to the digital transmitting circuit 1406. The selector 1604 has a first input port P1 arranged to receive the digital input carrying the in-phase channel information I and the quadrature channel information Q, a second input port P2 arranged to receive a preset digital input (e.g., "0" and "1"), and an output port P3 selectively coupled to the first input port P1 or the second input port P2 according to the current operation mode. As can be seen from the figure, the input bit streams of the digital transmitting circuit 1406 are derived from an output of the selector 1604.

Figure 17:
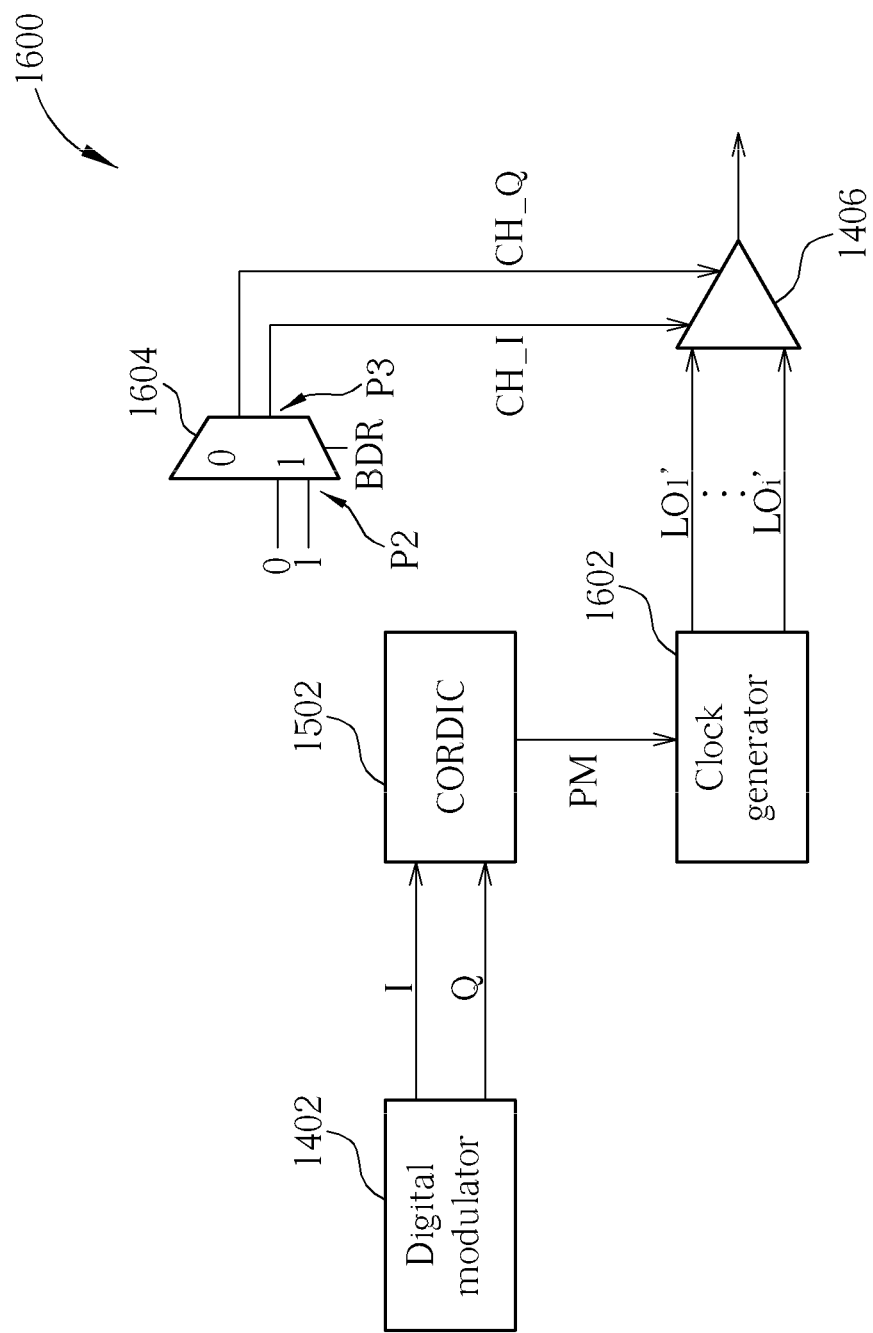
FIG. 17 is a diagram illustrating the wireless communication transmitter operating under a first operation mode.

By way of example, but not limitation, the wireless communication transmitter 1600 may be implemented in a Bluetooth application operating under the BDR mode which uses the GFSK modulation and a Bluetooth application operating an Enhanced Data Rate (EDR) mode which uses the QPSK/8PSK modulation. When the operation mode of the Bluetooth application is the BDR mode, a two-point direct-frequency modulation (TP-DFM) is employed for high efficiency. Please note that the BDR mode would use the GFSK modulation which does not require the amplitude modulation. FIG. 17 is a diagram illustrating the wireless communication transmitter 1600 operating under a first operation mode (e.g., the BDR mode). As can be seen from the figure, the CORDIC 1502 is enabled to generate the phase modulation signal PM to the clock generator 1602, and the clock generator 1602 generates the non-overlapping clock signals $LO_1$-$LO_i$ according to the phase modulation signal PM. Besides, the selector 1604 couples the output port P3 to the second input port P2, and outputs the preset input data to the digital transmitting circuit 1406.

Figure 18:
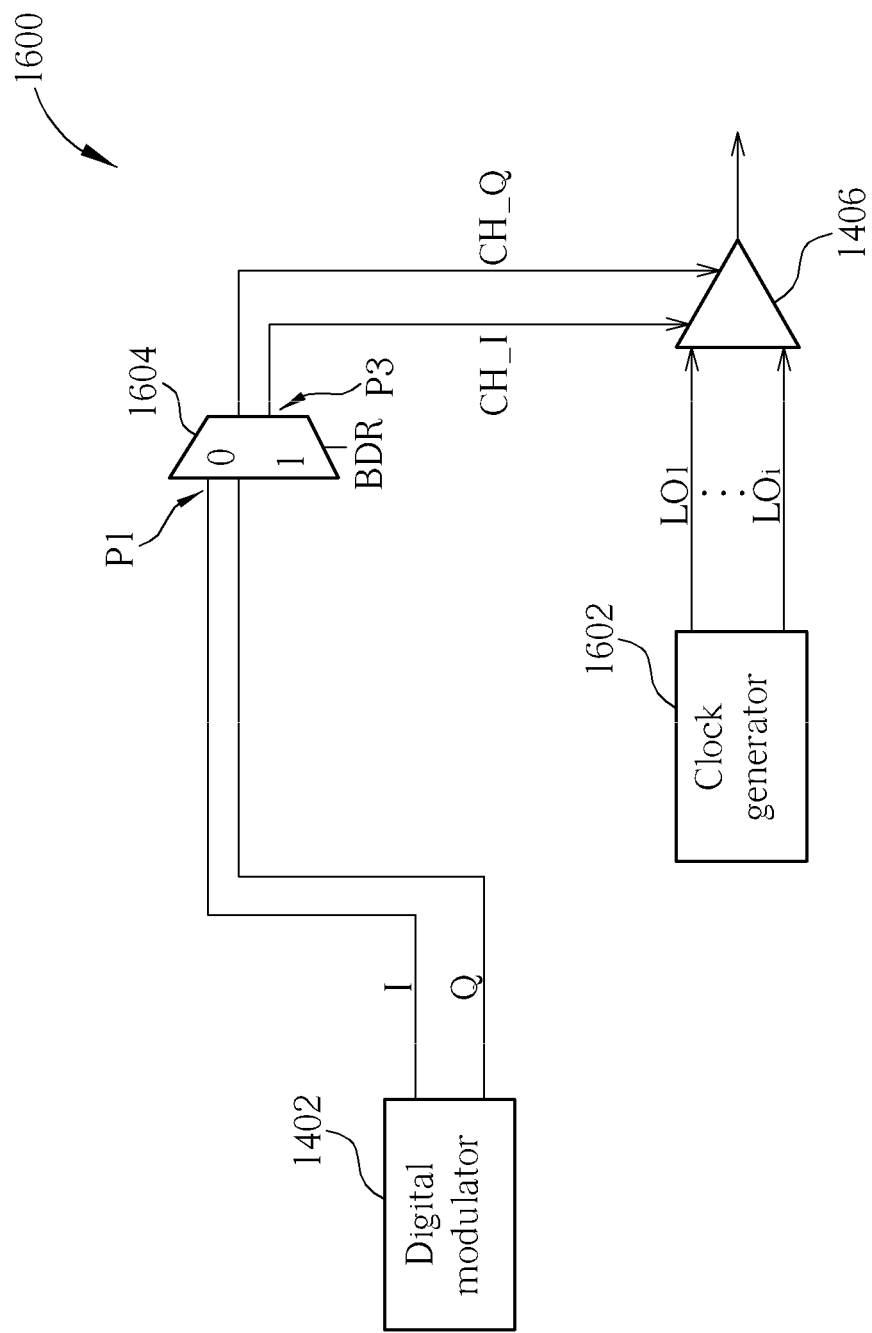
FIG. 18 is a diagram illustrating the wireless communication transmitter operating under a second operation mode.

When the operation mode of the Bluetooth application is the EDR mode, a Cartesian (I/Q) modulation is employed for high accuracy. Please refer to FIG. 18, which is a diagram illustrating the wireless communication transmitter 1600 operating under a second operation mode (e.g., the EDR mode). As can be seen from the figure, the CORDIC 1502 is disabled. Thus, the clock generator 1602 generates the non-overlapping clock signals $LO_1$-$LO_i$ without referring to a frequency modulation signal derived from the phase modulation signal PM. In addition, the selector 1604 couples the output port P3 to the first input port P2, and outputs the digital input generated from the digital modulator 1402 to the digital transmitting circuit 1406.

Figure 19:
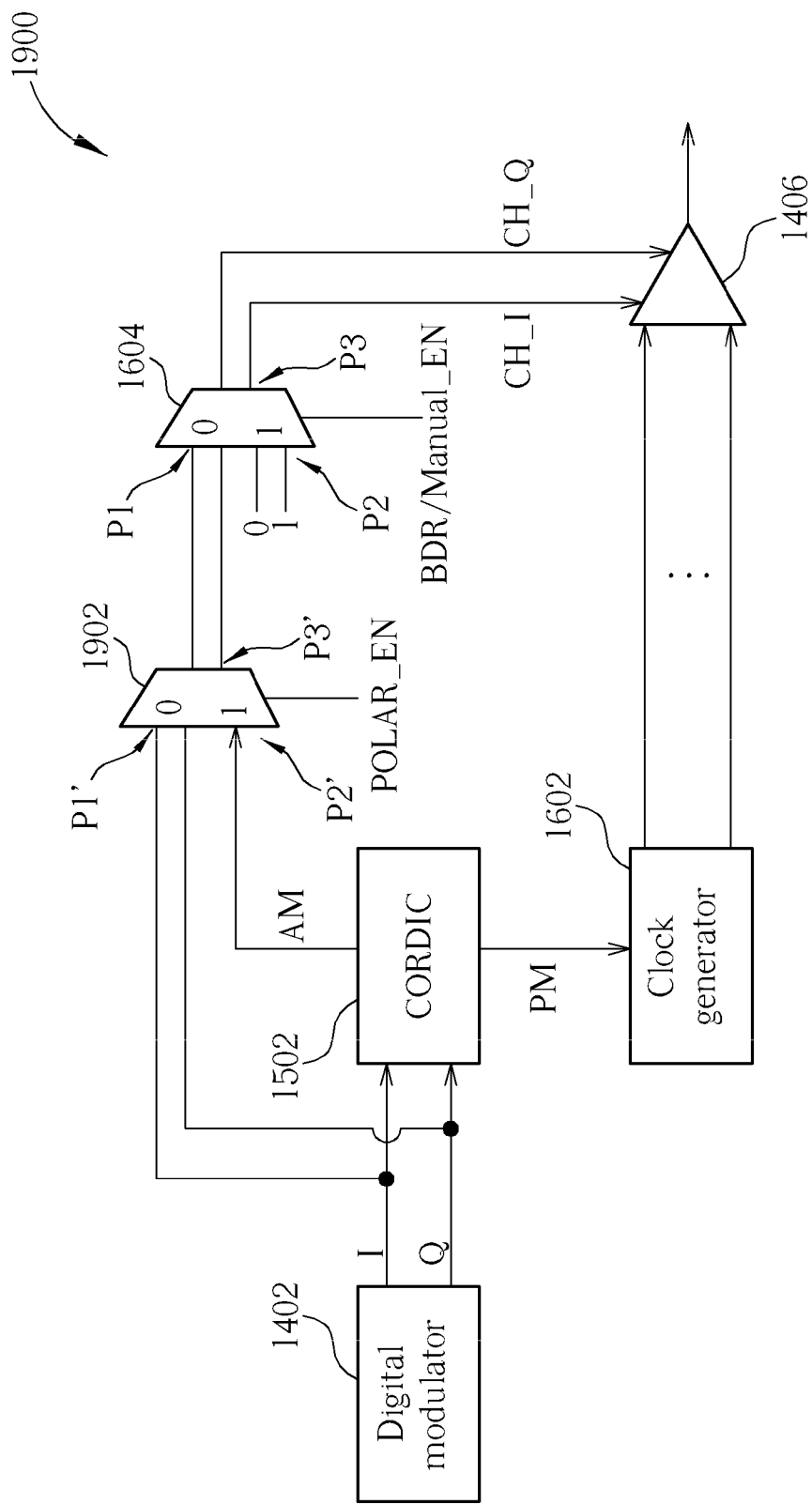
FIG. 19 is a diagram illustrating a wireless communication transmitter with a software-defined radio (SDR) configuration according to an exemplary embodiment of the present invention.

FIG. 19 is a diagram illustrating a wireless communication transmitter with a software-defined radio (SDR) configuration according to an exemplary embodiment of the present invention. The wireless communication transmitter 1900 includes, but is not limited, a selector 1902 and the aforementioned digital modulator 1402, CORDIC 1502, clock generator 1602, selector 1604, and digital transmitting circuit 1406. The wireless communication transmitter 1900 is devised to support multiple transmitter configurations. By way of example, but not limitation, the wireless communication transmitter 1900 may be implemented in an LTE application, a WiMAX application, a WCDMA application, an EDGE application, a GSM application, a WiFi application, or a Bluetooth application. The selector 1902 has a first input port P1' arranged to receive the digital input generated from the digital modulator 1402, a second input port P2' arranged to receive the amplitude modulation signal AM generated from the CORDIC 1502, and an output port P3' selectively coupled to the first input port P1' or the second input port P2' according to a control signal POLAR_EN. For example, when the polar configuration is selected, the control signal POLAR_EN will make the output port P3' coupled to the second input port P2' for allowing the amplitude modulation signal AM to arrive at the first input port P1 of the selector 1604; otherwise, the control signal POLAR_EN will make the output port P3' coupled to the first input port P1' for allowing an output of the digital modulator 1402 to arrive at the first input port P1 of the selector 1604. In this exemplary embodiment, the selector 1604 may be controlled according the enabling/disabling state of the BDR mode or may be manually controlled by a user input Manual_EN. Similarly, the input bit streams of the digital transmitting circuit 1406 are derived from an output of the selector 1604 through the in-phase bus CH_I and quadrature bus CH_Q. As a person skilled in the art can readily understand details of the wireless communication transmitter 1900 after reading above paragraphs pertinent to the exemplary wireless communication transmitters shown in FIG. 14, FIG. 15, and FIG. 16, further description is omitted here for brevity.

Briefly summarized, the exemplary wireless communication transmitter of the present invention has the following benefits/advantages over the transmitter design using the conventional I/Q RF DAC. Due to the hardware reuse of power transistors with I/Q combination accomplished at the gate terminals instead of the drain terminals, the power/current efficiency and silicon area usage efficiency can be improved. Regarding the IQ processing-based configuration with hardware reuse, the signal integrity/accuracy is good because the undesired I/Q imbalance can be easily minimized by performing the I/Q processing in the digital domain. Moreover, a wireless communication transmitter which includes a digital transmitting circuit using the proposed digital signal processing circuits is allowed to support a plurality of transmitter configurations, such as a polar configuration and a Cartesian configuration. Thus, a wireless communication transmitter with configuration flexibility is provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital signal processing circuit, comprising:
    a combining stage, arranged to receive a plurality of non-overlapping clock signals having a same frequency but different phases, receive a plurality of first input bit streams, and generate a first output bit stream by combining the first input bit streams according to the non-overlapping clock signals, wherein each of the non-overlapping clock signals alternates between a logic high level and a logic low level, and any two of the non-overlapping clock signals do not have the logic high level at a same time; and
    an output stage, arranged to generate an output signal according to the first output bit stream.

2. The digital signal processing circuit of claim 1, wherein the combining stage comprises:
    a plurality of first logic units, arranged to receive the non-overlapping clock signals, respectively, receive the first input bit streams, respectively, and generate a plurality of second output bit streams according to the non-overlapping clock signals and the first input bit streams, respectively; wherein each first logic unit generates a second output bit stream by performing a first logic operation upon a received non-overlapping clock signal and a received first input bit stream; and
    a second logic unit, arranged to receive the second output bit streams, and generate the first output bit stream by performing a second logic operation upon the received first output bit streams.

3. The digital signal processing circuit of claim 2, wherein the first logic units alternately output one bit to the second logic unit, and the second logic unit sequentially outputs bits received from the first logic units.

4. The digital signal processing circuit of claim 2, wherein the first logic units are AND gates, and the second logic unit is an OR gate.

5. The digital signal processing circuit of claim 2, wherein the combining stage further comprises:
    a plurality of third logic units, arranged to receive the non-overlapping clock signals, respectively, receive a plurality of second input bit streams, respectively, and generate a plurality of third output bit streams according to the non-overlapping clock signals and the second input bit streams, respectively;
        wherein each of the third logic unit generates a third output bit stream by performing a third logic operation upon a received non-overlapping clock signal and a received second input bit stream; and
    a fourth logic unit, arranged to receive the third output bit streams, and generate a fourth output bit stream by performing a fourth logic operation upon the received third output bit streams;
wherein the first output bit stream and the fourth output bit stream form a differential output bit stream, and the output stage is further arranged to generate another output signal according to the fourth output bit stream.

6. The digital signal processing circuit of claim 5, further comprising:
a decoder, arranged to receive at least a differential input bit stream including a third input bit stream and a fourth input bit stream, and decode the differential input bit stream; wherein a first bit of the third input bit stream and a second bit of the fourth input bit stream correspond to a data to be processed; the decoder transmits the first bit to one first logic unit which receives a first non-overlapping clock signal and transmits the second bit to one third logic unit which receives a second non-overlapping clock signal when a sign bit of the data to be processed has a first binary digit, and transmits the first bit to one third logic unit which receives the first non-overlapping clock signal and transmits the second bit to one first logic unit which receives the second non-overlapping clock signal when the sign bit of the data to be processed has a second binary digit; and the first non-overlapping clock signal and the second non-overlapping clock signal have a 180-degree phase difference therebetween.

7. A digital signal processing method, comprising:
receiving a plurality of non-overlapping clock signals having a same frequency but different phases, wherein each of the non-overlapping clock signals alternates between a logic high level and a logic low level, and any two of the non-overlapping clock signals do not have the logic high level at a same time;
receiving a plurality of first input bit streams;
generating a first output bit stream by combining the first input bit streams according to the non-overlapping clock signals; and
generating an output signal according to the first output bit stream.

8. The method of claim 7, wherein the step of generating the first output bit stream by combining the first input bit streams according to the non-overlapping clock signals comprises:
generating a plurality of second output bit streams according to the non-overlapping clock signals and the first input bit streams, wherein each second output bit stream is generated by performing a first logic operation upon a received non-overlapping clock signal and a received first input bit stream; and
generating the first output bit stream by performing a second logic operation upon the received first output bit streams.

9. The digital signal processing method of claim 8, wherein the first logic operations alternately output one bit to be processed by the second logic operation, and the second logic operation sequentially outputs bits generated from the first logic operations.

10. The digital signal processing method of claim 8, wherein the first logic operation is an AND operation, and the second logic operation is an OR operation.

11. The digital signal processing method of claim 8, further comprising:
receiving a plurality of second input bit streams;
generating a plurality of third output bit streams according to the non-overlapping clock signals and the second input bit streams, wherein each third output bit stream is generated by performing a third logic operation upon a received non-overlapping clock signal and a received second input bit stream;
receiving the third output bit streams, and generating a fourth output bit stream by performing a fourth logic operation upon the received third output bit streams; and
generating another output signal according to the fourth output bit stream;
wherein the first output bit stream and the fourth output bit stream form a differential output bit stream.

12. The digital signal processing method of claim 11, further comprising:
receiving at least a differential input bit stream including a third input bit stream and a fourth input bit stream; and
decoding the differential input bit stream, wherein a first bit of the third input bit stream and a second bit of the fourth input bit stream correspond to a data to be processed; the decoder transmits the first bit to one first logic unit which receives a first non-overlapping clock signal and transmits the second bit to one third logic unit which receives a second non-overlapping clock signal when a sign bit of the data to be processed has a first binary digit, and transmits the first bit to one third logic unit which receives the first non-overlapping clock signal and transmits the second bit to one first logic unit which receives the second non-overlapping clock signal when the sign bit of the data to be processed has a second binary digit; and the first non-overlapping clock signal and the second non-overlapping clock signal have a 180-degree phase difference therebetween.

13. A digital signal processing circuit, comprising:
a combining stage, arranged to receive a plurality of non-overlapping clock signals having a same frequency but different phases, receive a plurality of input bit streams, and alternately output bits of the input bit streams under a timing control provided by the non-overlapping clock signals, wherein each of the non-overlapping clock signals alternates between a logic high level and a logic low level, and any two of the non-overlapping clock signals do not have the logic high level at a same time; and
an output stage, arranged to receive the bits of the input bit streams from the combining stage and then process the bits of the input bit streams.

14. The digital signal processing circuit of claim 13, wherein the output stage comprises:
a power transistor, having a control terminal sequentially controlled according to the bits of the input bit streams.

15. A digital signal processing method, comprising:
receiving a plurality of non-overlapping clock signals having a same frequency but different phases;
receiving a plurality of input bit streams;
alternately output bits of the input bit streams under a timing control provided by the non-overlapping clock signals; and
utilizing an output stage for receiving the bits of the input bit streams and then processing the bits of the input bit streams.

16. The digital signal processing method of claim 15, wherein the step of utilizing the output stage shared by the input bit streams for processing the bits of the input bit streams comprises:
sequentially controlling a control terminal of a power transistor included in the output stage according to the bits of the input bit streams.

17. A wireless communication transmitter, comprising:
a clock generator, arranged to generate a plurality of non-overlapping clock signals having a same frequency but different phases, wherein each of the non-overlapping clock signals alternates between a logic high level and a logic low level, and any two of the non-overlapping clock signals do not have the logic high level at a same time;

a digital modulator, arranged to generate a digital input which carries in-phase channel information and quadrature channel information in a Cartesian domain; and a plurality of digital signal processing circuits, each comprising:

a combining stage, arranged to receive the non-overlapping clock signals, receive a plurality of input bit streams derived from the digital input, and generate an output bit stream by combining the input bit streams according to the non-overlapping clock signals; and an output stage, arranged to generate an output signal to an output port of the wireless communication transmitter according to the output bit stream.

18. A wireless communication transmitter, comprising:

a digital modulator, arranged to generate a digital input which carries in-phase channel information and quadrature channel information in a Cartesian domain;

a computation circuit, arranged to process the in-phase channel information and the quadrature channel information, and accordingly generate an amplitude modulation signal and a phase modulation signal in a polar domain;

a clock generator, arranged to refer to the phase modulation signal generated from the computation circuit to generate a plurality of non-overlapping clock signals having a same frequency but different phases; and a plurality of digital signal processing circuits, each comprising:

a combining stage, arranged to receive the non-overlapping clock signals, receive a plurality of input bit streams each derived from the amplitude modulation signal generated from the computation circuit, and generate an output bit stream by combining the input bit streams according to the non-overlapping clock signals, wherein the input bit streams are identical to each other; and an output stage, arranged to generate an output signal to an output port of the wireless communication transmitter according to the output bit stream.

19. A wireless communication transmitter, comprising:

a digital modulator, arranged to generate a digital input which carries in-phase channel information and quadrature channel information in a Cartesian domain;

a computation circuit, arranged to process the in-phase channel information and the quadrature channel information, and accordingly generate a phase modulation signal in a polar domain;

a clock generator, arranged to generate a plurality of non-overlapping clock signals having a same frequency but different phases, wherein when the computation circuit is enabled to generate the phase modulation signal to the clock generator, the clock generator refers to the phase modulation signal to generate the non-overlapping clock signals, and when the computation circuit is disabled, the clock generator generates the non-overlapping clock signals without referring to the phase modulation signal;

a selector, having a first input port arranged to receive the digital input, a second input port arranged to receive a preset digital input, and an output port selectively coupled to the first input port or the second input port; and a plurality of digital signal processing circuits, each comprising:

a combining stage, arranged to receive the non-overlapping clock signals, receive a plurality of input bit streams derived from an output of the selector, and generate an output bit stream by combining the input bit streams according to the non-overlapping clock signals; and an output stage, arranged to generate an output signal to an output port of the wireless communication transmitter according to the output bit stream.

20. A wireless communication transmitter, comprising:

a digital modulator, arranged to generate a digital input which carries in-phase channel information and quadrature channel information in a Cartesian domain;

a computation circuit, arranged to process the in-phase channel information and the quadrature channel information, and accordingly generate an amplitude modulation signal and a phase modulation signal in a polar domain;

a clock generator, arranged to generate a plurality of non-overlapping clock signals having a same frequency but different phases, wherein when the computation circuit is enabled to generate the phase modulation signal to the clock generator, the clock generator refers to the phase modulation signal to generate the non-overlapping clock signals, and when the computation circuit is disabled, the clock generator generates the non-overlapping clock signals without referring to the phase modulation signal;

a first selector, having a first input port arranged to receive the digital input, a second input port arranged to receive the amplitude modulation signal, and an output port selectively coupled to the first input port of the first selector or the second input port of the first selector;

a second selector, having a first input port arranged to receive an output of the first selector, a second input port arranged to receive a preset digital input, and an output port selectively coupled to the first input port of the second selector or the second input port of the second selector; and a plurality of digital signal processing circuits, each comprising:

a combining stage, arranged to receive the non-overlapping clock signals, receive a plurality of input bit streams derived from an output of the second selector, and generate an output bit stream by combining the input bit streams according to the non-overlapping clock signals; and an output stage, arranged to generate an output signal to an output port of the wireless communication transmitter according to the output bit stream.

* * * * *